(12) United States Patent
Gardet

(10) Patent No.: US 11,041,044 B2
(45) Date of Patent: Jun. 22, 2021

(54) COMPOSITIONS FOR THE PRODUCTION OF OBJECTS USING ADDITIVE MANUFACTURING

(71) Applicant: Eastman Chemical Company, Kingsport, TN (US)

(72) Inventor: Ludovic Gardet, Nice (FR)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 16/588,238

(22) Filed: Sep. 30, 2019

(65) Prior Publication Data

US 2020/0024389 A1 Jan. 23, 2020

Related U.S. Application Data

(60) Continuation of application No. 15/871,217, filed on Jan. 15, 2018, now abandoned, which is a division of application No. 15/245,221, filed on Aug. 24, 2016, now abandoned.

(60) Provisional application No. 62/215,950, filed on Sep. 9, 2015.

(51) Int. Cl.
| | |
|---|---|
| *C08G 63/199* | (2006.01) |
| *B33Y 70/00* | (2020.01) |
| *B33Y 10/00* | (2015.01) |
| *B32B 27/36* | (2006.01) |
| *C08G 63/181* | (2006.01) |
| *C08G 63/16* | (2006.01) |
| *C08L 67/02* | (2006.01) |
| *B29C 64/118* | (2017.01) |

(52) U.S. Cl.
CPC .......... *C08G 63/199* (2013.01); *B29C 64/118* (2017.08); *B32B 27/36* (2013.01); *B33Y 10/00* (2014.12); *B33Y 70/00* (2014.12); *C08G 63/16* (2013.01); *C08G 63/181* (2013.01); *C08L 67/02* (2013.01)

(58) Field of Classification Search
CPC ..... B29C 64/106; B29C 64/118; B32B 27/36; B33Y 10/00; B33Y 70/00; C08G 63/16; C08G 63/181; C08G 63/199; C08L 67/02
See application file for complete search history.

(56) References Cited

U.S. PATENT DOCUMENTS

| | | | |
|---|---|---|---|
| 2,901,466 A | 8/1959 | Kibler et al. | |
| 4,256,861 A | 3/1981 | Davis et al. | |
| 4,539,390 A | 9/1985 | Jackson, Jr. et al. | |
| 5,030,708 A | 7/1991 | Krutak et al. | |
| 5,102,980 A | 4/1992 | Krutak et al. | |
| 5,194,571 A | 3/1993 | Weaver et al. | |
| 5,633,340 A | 5/1997 | Hoffman et al. | |
| 8,287,991 B2 | 10/2012 | Donelson et al. | |
| 8,586,652 B2 | 11/2013 | Williams et al. | |
| 2004/0214984 A1* | 10/2004 | Keep | C08K 5/1515 528/359 |
| 2016/0177078 A1* | 6/2016 | Naito | C08L 25/12 264/109 |
| 2018/0065294 A1 | 3/2018 | Yamashita et al. | |

FOREIGN PATENT DOCUMENTS

| | | |
|---|---|---|
| CN | 103980449 A | 8/2014 |
| CN | 103980467 A | 8/2014 |
| CN | 104629278 A | 5/2015 |
| CN | 104877118 A | 9/2015 |
| WO | WO 2008/042226 A1 | 4/2008 |
| WO | WO 2015/037574 | * 3/2015 |

OTHER PUBLICATIONS

MiniFibers ,Inc—Choosing The Proper Short Cut Fiber for Your Nonwoven Web—Conversion from Denier to Microns, 2018 (Year: 2018).*
McKee et al "Branched polyesters: recent advances in synthesis and performance", Prog. Polym. Sci. 30 (2005) 507-539 (Year: 2005).*
ASTM D648; "Standard Test Method for Deflection Temperature of Plastics Under Flexural Load in the Edgewise Position"; Apr. 1, 2016.
ASTM D638; "Standard Test Method for Tensile Properties of Plastics"; Dec. 15, 2014.
ASTM D790; "Standard Test Methods for Flexural Properties of Unreinforced and Reinforced Plastics and Electrical Insulating Materials"; Dec. 1, 2015.
ASTM D4812; "Standard Test Method for Unnotched Cantilever Beam Impact Resistance of Plastics"; Dec. 1, 2011.

(Continued)

*Primary Examiner* — Ling Siu Choi
*Assistant Examiner* — Gennadiy Mesh
(74) *Attorney, Agent, or Firm* — Robert C. Morriss

(57) ABSTRACT

Filament comprising a polymeric material that includes a diacid component comprising from about 40 to 60 mole % of units derived from terephthalic acid and from about 40 to 60 mole % of units derived from a diacid chosen from isophthalic acid, a cyclohexanedicarboxylic acid, a naphthalenedicarboxylic acid, a stilbenedicarboxylic acid, or a combination thereof; a glycol component comprising at least 75 mole % of units derived from cyclohexanedimethanol; wherein the polymeric material has an inherent viscosity loss of 3% or less after being extruded; and method of using this filament in production of different articles by 3D printing are disclosed.

9 Claims, 8 Drawing Sheets

(56) References Cited

OTHER PUBLICATIONS

ASTM D256; "Standard Test Methods for Determining the Izod Pendulum Impact Resistance of Plastics"; May 1, 2010.
Notification of Transmittal of The International Search Report and The Written Opinion of the International Searching Authority, or the Declaration; International Application No. PCT/US2016/048522 dated Nov. 7, 2016.

* cited by examiner

Sample 1

COMPOSITIONS FOR THE PRODUCTION OF OBJECTS USING ADDITIVE MANUFACTURING

CROSS REFERENCE TO RELATED APPLICATIONS

This application is a Continuation of U.S. patent application Ser. No. 15/871,217, filed Jan. 15, 2018, which is Divisional of U.S. patent application Ser. No. 15/245,221, filed Aug. 24, 2016, which claims the benefit of U.S. Provisional Patent Application No. 62/215,950, filed Sep. 9, 2015, the contents of which are incorporated herein by reference in their entirety.

BACKGROUND

Additive manufacturing is a process used to produce three-dimensional (3D) objects. Additive manufacturing can be performed by extruding a material through a nozzle and depositing (typically layer-by-layer) the material onto a substrate to form an object. In some instances, the material used to form the layers of the 3D object may be referred to herein as "build material." Extrusion-based additive manufacturing is sometimes called "Fused Deposition Modeling®" (FDM®), which is a trademark of Stratasys Ltd. Of Edina, Minn., "fused filament fabrication" (FFF), or more generally, "3D printing."

Additive manufacturing processes often utilize electronic data that represents an object, such as a computer-aided design (CAD) model of the object, to form the object. The electronic data can be processed by a computing device component of the additive manufacturing apparatus (e.g., a 3D printer) to form the object. For example, an electronic representation of the object can be mathematically sliced into multiple horizontal layers. The horizontal layers can have contours that will produce the shape of the object being formed by the additive manufacturing apparatus. The computing device component can generate a build path to form the contours for each horizontal layer and send control signals to the extrusion portion of the additive manufacturing apparatus to move a nozzle along the build path to deposit an amount of the build material to form each of the horizontal layers. The horizontal layers are formed on top of each other by depositing fluent strands (also referred to as "roads") of the build material in a layer-by-layer manner onto a platform or a build substrate. For example, the additive manufacturing system can move an extrusion head, the build substrate, or both the extrusion head and the build substrate vertically and horizontally relative to each other to form the object. The build material from which the object is formed hardens shortly after extrusion to form a solid 3D object.

SUMMARY

The disclosure is directed to compositions for producing objects using an additive manufacturing process. The compositions can be formed into a filament that is used in an additive manufacturing process to produce an object.

An article can comprise a plurality of layers of a polymeric material that includes units of a diacid component and units of a glycol component. The units of the diacid component can be derived from a first acid and a second acid. A process can be used to form the article that includes depositing a plurality of layers of a polymeric material onto a substrate. In some cases, the plurality of layers are deposited onto the substrate according to a predetermined design.

An article can also comprise a body including a polymeric material that includes units of a diacid component and units of a glycol component, where the units of the diacid component are derived from a first acid and a second acid. The body of the article can have a diameter from about 1 mm to about 5 mm and a length of at least about 3 cm. The article can be formed by a process that includes combining a diacid component and a glycol component to form a polymeric material and extruding the polymeric material to form a filament.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Figure 1:
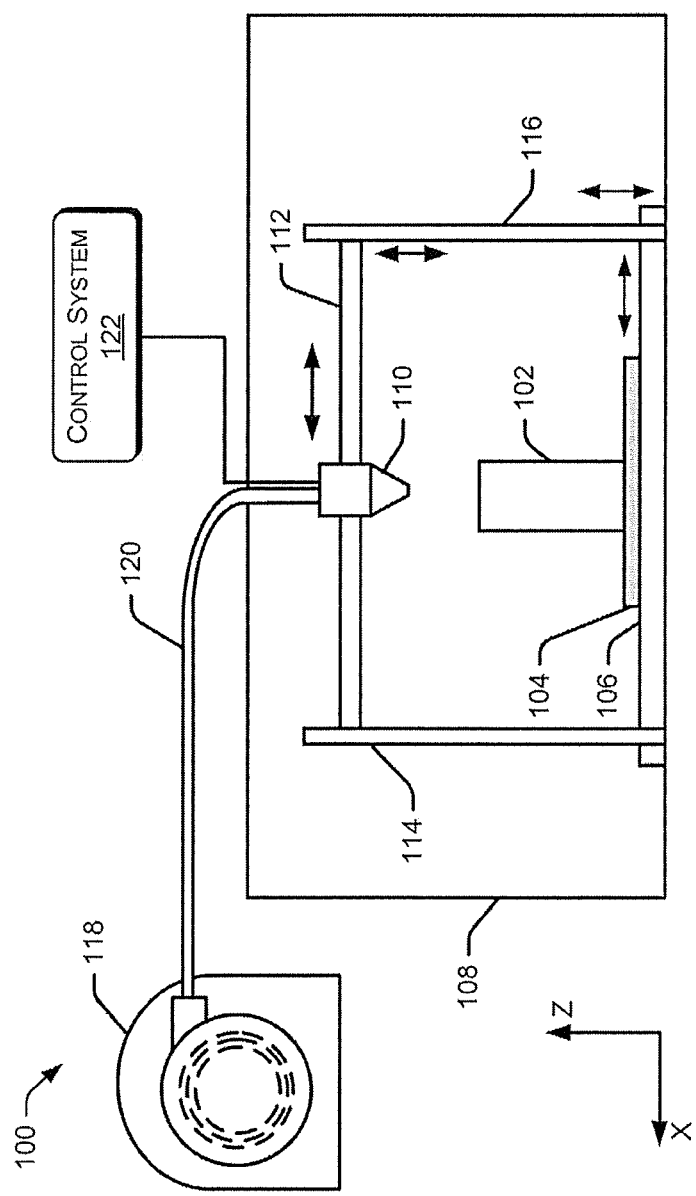
FIG. 1 illustrates example components of a first example additive manufacturing system.

The present disclosure is directed to, among other things, techniques, systems, and materials for producing objects using an additive manufacturing system. An object can be produced by depositing one or more layers of a build material on a surface of the substrate according to a predetermined design, which may be based on three-dimensional (3D) model data. The build material can be formed in the shape of a filament. The filament can be formed by combining a glycol component and a diacid component to produce a polymeric material and extruding the polymeric material. In some cases, the polymeric material can include a co-polyester having units derived from cyclohexanedimethanol and units derived from terephthalic acid, isophthalic acid, cyclohexanedicarboxylic acid, naphthalenedicarboxylic acid, stilbenedicarboxylic acid, 2,2,4,4-Tetramethyl-1,3-cyclobutanediol, or a combination thereof.

The object formed using the techniques, systems, and materials disclosed herein can be intended for any suitable application including, without limitation, modeling, rapid prototyping, production, and the like. Additionally, the system used to create the object can be implemented in any suitable context including end-consumer systems, prosumer systems, or professional-grade additive manufacturing systems. For example, additive manufacturing systems, such as extrusion-based 3D printers, and materials for implementing the techniques disclosed herein can be manufactured and sold to consumers for at-home building of objects (e.g., "do-it-yourself" 3D printing kits, desktop 3D printers, packages including the substrate (e.g., a polymeric sheet) for use in 3D printers, and the like). A "package," as used herein, is meant to describe a collection of items or components that are packaged for commercial sale to consumers and usable as, or with, an additive manufacturing system. To illustrate, a package can include a filament of a build material. In addition, components of an additive manufacturing system can be offered as a bundle package, such as a 3D printer, build material filament, and/or a substrate that is to be used in the 3D printer to form objects. Instructions may be included in, or on, the package as well (e.g., printed text on the package or on a slip of paper inside the package), instructing a consumer to use the packaged contents in a specified manner.

Additionally, or alternatively, the materials and processes described herein can be implemented to mass manufacture objects with high throughput at additive manufacturing facilities. Industries that can benefit from the techniques, systems, and materials described herein include, without limitation, cosmetics (e.g., cosmetic container manufacturing), beverage container manufacturing, product enclosure manufacturing, and so on.

The techniques and systems disclosed herein can result in polymeric materials that can be used to form objects using additive manufacturing techniques. The polymeric materials can include properties that are conducive to forming the polymeric materials into a filament. For example, polymeric materials described herein for forming objects using additive manufacturing processes can have physical properties that enable the polymeric materials to be subject to extrusion and also to be rolled into a filament.

The polymeric materials can also have physical attributes that are conducive to additive manufacturing processes. To illustrate, the polymeric materials can have a viscosity and melt stability at temperatures utilized to form objects using additive manufacturing systems. In particular, the polymeric materials described herein have a viscosity that enables the polymeric materials to flow through an extrusion head with minimal, if any, clogging. Additionally, the melt stability of the polymeric materials minimizes degradation of the polymeric materials at temperatures that can be used to produce objects using additive manufacturing techniques.

Further, the polymeric materials can have physical properties that minimize shrinkage after extrusion and also provide sufficient adhesion with a substrate on which an object is being formed. Sufficient adhesion between the substrate and a build material used to form an object via additive manufacturing can minimize defects in the object. In many situations, selecting a build material, substrate, and additive manufacturing system to achieve sufficient adhesion characteristics at an interface between the substrate and the object can be based on a number of factors. For example, if a partially completed object does not have sufficient adhesion with the substrate, the partially completed object can move and change its position on the substrate. Accordingly, subsequent layers of the build material can be deposited in a manner that causes a shape of the object to deviate from an intended shape. In another example, without sufficient adhesion between a build material and the substrate on which an object is being formed, the partially completed object can become detached from the substrate preventing the completion of the object.

Further, there can be some defects in objects that are caused by the adhesion between a build material used to form an object and the substrate on which the object is formed. In particular, the substrate, the object, or both can be damaged in some way when the object is removed from the substrate. For example, a physical object or tool, such as a chisel or knife, or a chemical process may be used to remove an object from the substrate and cause damage to the object and/or substrate, such as causing chips or flakes of material to be separated from the body of the object or the substrate.

The techniques and systems described herein can be implemented in a number of ways. Example implementations are provided below with reference to the following figures.

FIG. 1 illustrates example components of a first example additive manufacturing system 100. The system 100 can be configured to manufacture objects by utilizing additive manufacturing principles. For example, the system 100 can be considered a Fused Deposition Modeling® (FDM®) system, a fused filament fabrication (FFF) system, or more generally, a 3D printing system (or 3D printer). In particular, the system 100 can be used to produce an object 102 by depositing layers of a build material on a substrate 104 that is disposed on a platform 106. After the object 102 is completed, the object 102 can be separated from the substrate 104. In some cases, the object 102 can be removed from the substrate 104 by hand, with a tool, by bending the substrate, or combinations thereof. In other cases, a layer can be formed on the substrate 104 that can aid in the removal of the object 102 from the substrate 104. To illustrate, a water-dispersible layer can be formed between layers of the object 102 and the substrate 104. The water-dispersible layer can include material that provides sufficient adhesion between the substrate 104 and the layers of the object 102 such that defects can be minimized in the formation of the object 102. The object 102 can be removed from the substrate 104 by breaking down the water-dispersible layer through contact with an amount of water.

The substrate 104 can be positioned on the platform 106, where the platform 106 is configured to support the substrate 104. In this manner, the substrate 104 can be provided on the platform 106 as a "working surface" for building the object 102 on the substrate 104. The substrate 104 can include a glass material, in some cases. In other cases, the substrate 104 can include one or more polymeric materials.

The substrate 104 can be removably mounted, attached, or fastened to the platform 106 using an attachment mechanism including, without limitation, one or more bolts, clamps, hooks, latches, locks, nails, nuts, pins, screws, slots, retainers, adhesive, Velcro®, tape, or any other suitable attachment mechanism that allows for the substrate 104 to be secured to the platform 106 during the formation of the object 102, yet to also be removable after the object 102 is formed. In some cases, suction can be applied to the substrate 104 to hold the substrate 104 in place during formation of the object 102. For example, one or more holes can be provided in the platform 106 and suction, or a vacuum, can be applied via the one or more holes to force the substrate 104 toward the platform 106. In some examples, mounting the substrate 104 on the platform 106 can include setting (laying or placing) the substrate 104 on the platform 106 without any additional securing mechanism.

The system 100 can include a housing 108 for a number of the components of the system 100. The housing 108 can be formed from a number of materials, such as one or more metals, one or more polymers, or a combination thereof. The system 100 can also include an extrusion head 110. The extrusion head 110 can be configured to extrude build material onto the substrate 104 during the process of forming the object 102. The extrusion head 110 can be any suitable type of extrusion head 110 configured to receive material and to extrude the material through a nozzle (or tip) that includes an orifice from which fluent strands or "roads" of the build material can be deposited onto the substrate 104 in a layer-by-layer manner to form the object 102. Nozzles of varying-sized orifices can be utilized for depositing roads of build material having different thicknesses from the extrusion head 110.

The extrusion head 110 can include a heating element that heats the build material to a temperature that causes the build material to become flowable before extruding the build material onto the substrate 104. The temperature applied to heat the build material in the extrusion head 110 can be at least about 180° C., at least about 190° C., at least about 200° C., or at least about 210° C. Additionally, the temperature applied to heat the build material in the extrusion head 112 can be no greater than about 260° C., no greater than about 250° C., no greater than about 240° C., no greater than about 230° C., or no greater than about 220° C. In an illustrative example, the temperature applied to heat the build material in the extrusion head 110 can be included in a range of about 175° C. to about 275° C. In another illustrative example, the temperature applied to heat the build material in the extrusion head 112 can be included in a range of about 195° C. to about 245° C. In an additional illustrative example, the temperature applied to heat the build material in the extrusion head 112 can be included in a range of about 220° C. to about 240° C.

During operation of the system 100, the substrate 104 can be initially positioned below the extrusion head 110 in a direction along the Z-axis shown in FIG. 1 at a time prior to the first layer of build material being deposited. The distance at which the substrate 104 is spaced below the extrusion head 110 can be any suitable distance allowing for the deposition of fluent strands or "roads" of build material at a desired thickness. In some instances, a distance between the substrate 104 and the extrusion head 110 prior to deposition of the first layer of build material can be from about 0.02 mm to about 4 mm. As layers of the build material are deposited to form the object 102, the extrusion head 110 can be moved a distance in increments in the Z-direction that allows for depositing a next layer of build material at a specified thickness. In some examples, the incremented distance can be about 0.1 mm.

The extrusion head 110 can be coupled to a horizontal rail 112. The extrusion head 110 can move along the horizontal rail 112 in the X-direction. The extrusion head 110 can move along the horizontal rail 112 by the use of one or more stepper motors, one or more servo motors, one or more microcontrollers, one or more belts, combinations thereof, and the like. The system 100 can also include a first vertical rail 114 and a second vertical rail 116. Optionally, the horizontal rail 112 can be coupled to the first vertical rail 114 and the second vertical rail 116, such that the horizontal rail 112 can move vertically in the Z-direction along the first vertical rail 114 and the second vertical rail 116.

The extrusion head 110 can move along the horizontal rail 112 and/or the first vertical rail 114 and the second vertical rail 116 at a speed of at least about 5 mm/second, at least about 10 mm/second, at least about 25 mm/second, at least about 50 mm/second, at least about 75 mm/second or at least about 125 mm/second. In addition, the extrusion head 110 can move along the horizontal rail 112 and/or the first vertical rail 114 and the second vertical rail 116 at a speed no greater than about 400 mm/second, no greater than about 350 mm/second, no greater than about 300 mm/second, no greater than about 250 mm/second, no greater than about 200 mm/second, or no greater than about 150 mm/second. In an illustrative example, the extrusion head 110 can move along the horizontal rail 112 and/or the first vertical rail 114 and the second vertical rail 116 at a speed included in a range of about 2 mm/second to about 500 mm/second. In another illustrative example, the extrusion head 110 can move along the horizontal rail 112 and/or the first vertical rail 114 and the second vertical rail 116 at a speed included in a range of about 20 mm/second to about 300 mm/second. In an additional illustrative example, the extrusion head 110 can move along the horizontal rail 112 and/or the first vertical rail 114 and the second vertical rail 116 at a speed included in a range of about 30 mm/second to about 100 mm/second.

The system 100 can also include a material source 118 that stores a build material for forming objects using the system 100. The material source 118 can be coupled to the extrusion head 110 by a supply line 120. The material source 118 can include a material bay or housing containing a spool of build material filament that can be unwound from the spool by a motor or drive unit. In some examples, supplying of the build material through the supply line 120 can be turned on or off, and the build material can be advanced in both forward and backward directions along the supply line 120. Retraction of the build material along the supply line 120 toward the material source 118 can minimize "drool" at the extrusion head 110 and/or allow for recycling of unused build material after finishing the object 102. Moreover, the rate at which the build material is supplied to the extrusion head 110 can be controlled by a drive unit (e.g., worm drive) at varying speeds so that speeds can be increased or decreased.

An extrusion rate at which the build material flows through the extrusion head 110 can be at least about 3 $mm^3/s$, at least about 3.5 $mm^3/s$, at least about 4 $mm^3/s$, at least about 4.5 $mm^3/s$, at least about 5 $mm^3/s$, at least about 5.5 $mm^3/s$, at least about 6 $mm^3/s$, at least about 10 $mm^3/s$, at least about 20 $mm^3/s$, at least about 50 $mm^3/s$, at least about 100 $mm^3/s$, at least about 200 $mm^3/s$, at least about 500 $mm^3/s$, at least about 1000 $mm^3/s$, or at least about 2000 $mm^3/s$. Also, an extrusion rate at which the build material flows through the extrusion head 110 can be no greater than about 10 $mm^3/s$, no greater than about 9.5 $mm^3/s$, no greater than about 9 $mm^3/s$, no greater than about 8.5 $mm^3/s$, no greater than about 8 $mm^3/s$, no greater than about 7.5 $mm^3/s$, no greater than about 7 $mm^3/s$, or no greater than about 6.5 $mm^3/s$. In an illustrative example, an extrusion rate at which the build material flows through the extrusion head 110 can be from about 2 $mm^3/s$ to about 8400 $mm^3/s$. In an illustrative example, an extrusion rate at which the build material flows through the extrusion head 110 can be from about 2 $mm^3/s$ to about 12 $mm^3/s$. In another illustrative example, an extrusion rate at which the build material flows through the extrusion head 110 can be from about 4 $mm^3/s$ to about 10 $mm^3/s$. In an additional illustrative example, an extrusion rate at which the build material flows through the extrusion head can be from about 7 mm$^3$/s to about 9 mm$^3$/s. In an illustrative example, an extrusion rate at which the build material flows through the extrusion head can be from about 7 mm$^3$/s to about 8400 mm$^3$/s. In an illustrative example, an extrusion rate at which the build material flows through the extrusion head can be from about 100 mm$^3$/s to about 8400 mm$^3$/s.

The build material stored by the material source 118 can include a polymeric material. For example, the build material can include a thermoplastic polymer. To illustrate, the build material can include a thermoplastic resin. Additionally, the build material can include a polyester. Further, the build material can include a copolymer. Optionally, the build material can include a copolyester.

The build material can include units of an acid component and units of a glycol component. The units of the acid component can be derived from one or more particular acids, while the units of the glycol component can be derived from one or more particular glycols. Additionally, the build material can include 100 mole % of the acid component and 100 mole % of the glycol component. In some cases, a portion of the glycol component or a portion of the acid component can include a branching agent. For example, the acid component or the glycol component can include at least about 0.1 mole % of a branching agent or no greater than about 1.5 mole % of a branching agent. The branching agent can include one or more of trimellitic anhydride, trimellitic acid, pyromellitic dianhydride, trimesic acid, hemimellitic acid, glycerol, trimethylolpropane, pentaerythritol, 1,2,4-butanetriol, 1,2,6-hexanetriol, sorbitol, 1,1,4,4-tetrakis(hydroxymethy)cyclohexane, di pentaerythritol, or combinations thereof.

The acid component can include units derived from one or more acids. In some cases, the acid component can include a diacid component. For example, the acid component can include units of a first acid and units of one or more second acids. To illustrate, the first acid can include terephthalic acid. In addition, the one or more second acids can be selected from a group of diacids including isophthalic acid, 1,3-cyclohexanedicarboxylic acid, 1,4-cyclohexanedicarboxylic acid, a naphthalenedicarboxylic acid, a stilbenedicarboxylic acid, sebacic acid, dimethylmalonic acid, succinic acid, or combinations thereof. In some particular examples, the naphthalenedicarboxylic acid can include 1,4-naphthalenedicarboxylic acid, 1,5-naphthalenedicarboxylic acid, 2,6-naphthalenedicarboxylic acid, or 2,7-naphthalenedicarboxylic acid.

The acid component can include at least about 30 mole % of units derived from the first acid, at least about 35 mole % of units derived from the first acid, at least about 38 mole % of units derived from the first acid, at least about 42 mole % of units derived from the first acid, at least about 45 mole % of units derived from the first acid, at least about 48 mole % of units derived from the first acid, at least about 50 mole % of units derived from the first acid, or at least about 52 mole % of units derived from the first acid. In addition, the acid component can include no greater than about 75 mole % of units derived from the first acid, no greater than about 70 mole % of units derived from the first acid, no greater than about 68 mole % of units derived from the first acid, no greater than about 65 mole % of units derived from the first acid, no greater than about 62 mole % of units derived from the first acid, no greater than about 60 mole % of units derived from the first acid, no greater than about 58 mole % of units derived from the first acid, or no greater than about 55 mole % of units derived from the first acid. In an illustrative example, the acid component can include from about 30 mole % to about 75 mole % of units derived from the first acid. In another illustrative example, the acid component can include from about 35 mole % to about 65 mole % of units derived from the first acid. In an additional illustrative example, the acid component can include from about 40 mole % to about 60 mole % of units derived from the first acid. In a further illustrative example, the acid component can include from about 45 mole % to about 55 mole % of units derived from the first acid.

Additionally, the acid component can include at least about 30 mole % of units derived from the one or more second acids, at least about 35 mole % of units derived from the one or more second acids, at least about 38 mole % of units derived from the one or more second acids, at least about 42 mole % of units derived from the one or more second acids, at least about 45 mole % of units derived from the one or more second acids, at least about 48 mole % of units derived from the one or more second acids, at least about 50 mole % of units derived from the one or more second acids, or at least about 52 mole % of units derived from the one or more second acids. In addition, the acid component can include no greater than about 75 mole % of units derived from the one or more second acids, no greater than about 70 mole % of units derived from the one or more second acids, no greater than about 68 mole % of units derived from the one or more second acids, no greater than about 65 mole % of units derived from the one or more second acids, no greater than about 62 mole % of units derived from the one or more second acids, no greater than about 60 mole % of units derived from the one or more second acids, no greater than about 58 mole % of units derived from the one or more second acids, or no greater than about 55 mole % of units derived from the one or more second acids. In an illustrative example, the acid component can include from about 30 mole % to about 75 mole % of units derived from the one or more second acids. In another illustrative example, the acid component can include from about 35 mole % to about 65 mole % of units derived from the one or more second acids. In an additional illustrative example, the acid component can include from about 40 mole % to about 60 mole % of units derived from the one or more second acids. In a further illustrative example, the acid component can include from about 45 mole % to about 55 mole % of units derived from the one or more second acids.

Further, the acid component can include, in some cases, amounts of units derived from additional acids, such as additional aliphatic dibasic acids having 4 to about 40 carbon atoms, additional cycloaliphatic dibasic acids having about 4 to about 40 carbon atoms, additional aromatic dibasic acids having about 4 to about 40 carbon atoms, or combinations thereof. In a particular example, the acid component can include no greater than about 10 mole % of units derived from one or more of the additional acids, no greater than about 8 mole % of units derived from one or more of the additional acids, no greater than about 6 mole % of units derived from one or more of the additional acids, or no greater than about 4 mole % of units derived from one or more of the additional acids. Additionally, the acid component can include at least about 0.5 mole % of units derived from one or more of the additional acids, at least about 1 mole % of units derived from one or more of the additional acids, or at least about 2 mole % of units derived from one or more of the additional acids. In an illustrative example, the acid component can include from about 0.5 mole % to about 10 mole % of units derived from one or more of the additional acids.

Optionally, esters of the acids can be used to form the polymeric material of the build material. In an example, lower alkyl esters of the acids can be used to form the polymeric material. In a particular example, methyl esters of the acids can be used to form the polymeric material. In an illustrative example, esters of terephthalic acid, esters of isophthalic acid, esters of 1,3-cyclohexanedicarboxylic acid, esters of 1,4 cyclohexanedicarboxylic acid, esters of a naphthalenedicarboxylic acid, esters of a stilbenedicarboxylic acid, or combinations thereof, can be used to form the polymeric material.

The glycol component can include units derived from cyclohexanedimethanol. Optionally, the polymeric material of the build material can include multiple glycols. For example, the glycol component can include units derived from a first glycol and units derived from one or more second glycols. To illustrate, the first glycol can include cyclohexanedimethanol and the one or more second glycols can include one or more glycols including about 2 to about 20 carbon atoms. In a particular example, the one or more second glycols can include ethylene glycol, 1,2-propanediol, 1,3-propanediol, neopentyl glycol, 1,4-butanediol, 1,5-pentanediol, 1,6-hexanediol, p-xylene glycol, or combinations thereof. In some cases, the build material can include polyethylene glycols, polytetramethylene glycols, 2,2,4,4-Tetramethyl-1,3-cyclobutanediol, or a combination thereof.

Optionally, when the glycol component includes units derived from multiple glycols, the glycol component can include at least about 75 mole % of units derived from the first glycol, at least about 78 mole % of units derived from the first glycol, at least about 80 mole % of units derived from the first glycol, at least about 82 mole % of units derived from the first glycol, or at least about 85% of units derived from the first glycol. In addition, when the glycol component includes units derived from multiple glycols, the glycol component can include no greater than about 98 mole % of units derived from the first glycol, no greater than about 95 mole % of units derived from the first glycol, no greater than about 92 mole % of units derived from the first glycol, no greater than about 90 mole % of units derived from the first glycol, or no greater than about 88 mole % of units derived from the first glycol. In an illustrative example, when the glycol component includes units derived from multiple glycols, the glycol component can include from about 75 mole % to about 98 mole % of units derived from the first glycol. In another illustrative example, when the glycol component includes units derived from multiple glycols, the glycol component can include from about 85 mole % to about 95 mole % of units derived from the first glycol.

Furthermore, when the glycol component includes units derived from multiple glycols, the glycol component can include no greater than about 25 mole % of units derived from the one or more second glycols, no greater than about 22 mole % of units derived from the one or more second glycols, no greater than about 20 mole % of units derived from the one or more second glycols, no greater than about 18 mole % of units derived from the one or more second glycols, no greater than about 15 mole % of units derived from the one or more second glycols, or no greater than about 12 mole % of units derived from the one or more second glycols. In some cases, when the glycol component includes units derived from multiple glycols, the glycol component can include at least about 1 mole % of units derived from the one or more second glycols, at least about 3 mole % of units derived from the one or more second glycols, at least about 5 mole % of units derived from the one or more second glycols, at least about 8 mole % of units derived from the one or more second glycols, or at least about 10 mole % of units derived from the one or more second glycols. In an illustrative example, when the glycol component includes units derived from multiple glycols, the glycol component can include from about 2 mole % to about 25 mole % of units derived from the one or more second glycols. In another illustrative example, when the glycol component includes units derived from multiple glycols, the glycol component can include from about 5 mole % to about 15 mole % of units derived from the one or more second glycols.

In one particular example, the polymeric material of the build material can be comprised of an acid component including from about 48 mole % to about 55 mole % units derived from terephthalic acid and from about 44 mole % to about 52 mole % units derived from isophthalic acid and a glycol component including units derived from 1,4-cyclohexanedimethanol. In another particular example, the polymeric material can be comprised of an acid component including from about 47 mole % to about 53 mole % units derived from terephthalic acid and from about 47 mole % to about 53 mole % units derived from isophthalic acid and a glycol component including units derived from 1,4-cyclohexanedimethanol.

Filament of the build material can have a diameter of at least about 0.5 mm, at least about 1 mm, at least about 1.5 mm, or at least about 2 mm. In addition, filament of the build material can have a diameter no greater than about 5 mm, no greater than about 4 mm, no greater than about 3 mm, or no greater than about 2.5 mm. In an illustrative example, the diameter of filament of the build material can be about 0.3 mm to about 6 mm. In an additional illustrative example, the diameter of the filament of the build material can be from about 1 mm to about 5 mm. In another illustrative example, the diameter of the filament of the build material can be from about 1.5 mm to about 3 mm. Further, filament of the build material can have a length from about 3 cm to about 10 cm, from about 15 cm to about 25 m, from about 30 cm to about 5 m, or from about 50 cm to about 1 m. In some cases, filament of the build material can have a length of at least about 3 cm, at least about 5 cm, at least about 10 cm, at least about 20 cm, at least about 30 cm, at least about 50 cm, at least about 1 m, at least about 2 m, or at least about 5 m. In other cases, filament of the build material can have a length no greater than about 25 m, no greater than about 20 m, no greater than about 15 m, no greater than about 12 m, no greater than about 10 m, no greater than about 8 m, or no greater than about 6 m. Additionally, filament of the build material can have a length of no greater than about 500 m, no greater than about 400 m, no greater than about 300 m, no greater than about 200 m, no greater than about 100 m, or no greater than about 50 m. In an illustrative example, filament of the build material can have a length from about 10 m to 500 m. In another illustrative example, filament of the build material can have a length from about 25 m to about 300 m. In an additional illustrative example, filament of the build material can have a length from about 50 m to about 200 m.

Optionally, the platform 106 can be heated to aid in the adhesion of the object 102 to the substrate 104 during the formation of the object 102. In an illustrative example, the platform 106 can be heated at a temperature included in a range of about 30° C. to about 125° C. Heating of the platform 106 can be performed by any suitable heating elements, such as electrical elements that can be turned on or off, gas heating elements below the platform 106, or any other suitable heating element. In some situations, though, the platform 106 may not be heated. In another illustrative example, the platform 106 can be heated at a temperature included in a range of about 40° C. to about 90° C. In some instances, the temperature at which the platform 106 is heated can depend on a glass transition temperature of the build material being deposited onto the substrate 104 to form the object 102. Further, heating the platform 106 can provide an anti-warping effect on the build material used to form the object 102.

The system 100 can include a control system 122. The control system 122 can include one or more hardware processor devices and one or more physical memory devices. The one or more physical memory devices can be examples of computer storage media for storing instructions which are executed by the one or more processors to perform various functions. The one or more physical memory devices can include both volatile memory and non-volatile memory (e.g., RAM, ROM, or the like). The one or more physical memory devices can also include one or more cache memory devices, one or more buffers, one or more flash memory devices, or a combination thereof. The system 100 can also include one or more additional components, such as one or more input/output devices. For example, the system 100 can include a keyboard, a mouse, a touch screen, a display, speakers, a microphone, a camera, combinations thereof, and the like. The system 100 can also include one or more communication interfaces for exchanging data with other devices, such as via a network, direct connection, or the like. For example, the communication interfaces can facilitate communications within a wide variety of networks or connections, such as one or more wired networks or wired connections and/or one or more wireless networks or wireless connections.

The control system 122 can include, be coupled to, or obtain data from a computer-aided design (CAD) system to provide a digital representation of the object 102 to be formed by the system 100. Any suitable CAD software program can be utilized to create the digital representation of the object 102. For example, a user can design, using a 3D modeling software program executing on a host computer, an object having a particular shape with specified dimensions, such as the object 102, that is to be manufactured using the system 100. In order to translate the geometry of the object 102 into computer-readable instructions or commands usable by a processor or a suitable controller in forming the object 102, the control system 122 can mathematically slice the digital representation of the object 102 into multiple horizontal layers. The control system 122 can then design build paths along which build material is to be deposited in a layer-by-layer fashion to form the object 102.

The control system 122 can manage and/or direct one or more components of the system 100, such as the extrusion head 110, by controlling movement of those components according to a numerically controlled computer-aided manufacturing (CAM) program along computer-controlled paths. Optionally, the control system 122 can control one or more components of the system 100 to move according to script written in a programming language, such as Python. The script can be used to produce code in a numerical programming language, such as G-code, that the control system 122 can execute. The movement of the various components of the system 100, such as the extrusion head 110, can be performed by the use of stepper motors, servo motors, microcontrollers, combinations thereof, and the like.

As build material is supplied to the extrusion head 110, the control system 122 directs the movement of the extrusion head 110 along the horizontal rail 112 and/or the vertical rails 114, 116 so that the extrusion head 110 can follow a predetermined build path while depositing build material for each layer of the object 102. In this sense, the rails 112, 114, 116 allow the extrusion head 110 to move two-dimensionally and/or three-dimensionally in vertical and/or horizontal directions as shown by the arrows in FIG. 1. Additionally, or alternatively, the platform 106 can be movable in two-dimensions and/or three-dimensions, and such movement can be controlled by the control system 122 to provide similar relative movement between the substrate 104 and platform 106 and the extrusion head 110 so that multiple roads of build material can be deposited by moving the extrusion head 110 and/or the platform 106 in a two-dimensional (2D) horizontal plane (i.e., X-Y plane) to form each layer of the object 102, and then multiple successive layers can be deposited on top of one another by moving the extrusion head 110 and/or the platform 106 in a vertical Z-direction.

Optionally, the substrate 104, the build material of the material source 118, or a combination thereof, can be included in a package that can be purchased and used in conjunction with the system 100. The package can also include instructions on how to form objects using the filament of build material with the system 100. For example, the instructions can indicate settings for the system 100, such as a temperature to heat the build material in the extrusion head 110, that correspond with the composition of the filament of build material.

The object 102 can be formed in a controlled environment, such as by confining individual ones of the components of the system 100 to a chamber or other enclosure formed by the housing 108 where temperature, and optionally other parameters (e.g., pressure) can be controlled and maintained at a desired level by elements configured to control temperature, pressure, etc. (e.g., heating elements, pumps, etc.). In some instances, the temperature applied to the build material can correspond to a temperature at or above the creep-relaxation temperature of the build material. This can allow more gradual cooling of the build material as it is deposited onto the substrate 104 so as to prevent warping of the layers of the object 102 upon deposition.

Although FIG. 1 illustrates one illustrative example of certain components of an additive manufacturing system usable for carrying out the techniques disclosed herein, it is to be appreciated that the configuration and inclusion of certain components shown in FIG. 1 is one, non-limiting, example of a suitable additive manufacturing system. Namely, other types and configurations of additive manufacturing systems can be utilized with the techniques and materials disclosed herein without changing the basic characteristics of the additive manufacturing system 100, and the additive manufacturing system 100 can be implemented as any suitable size for a particular industry or application, such as industrial-sized for commercial object production and/or testing, desktop-sized, handheld for consumer-use, and so on. For example, a handheld additive manufacturing system can be utilized to form the object 102 on the substrate 104 or a conveyor arrangement can be utilized to form the object 102 on the substrate 104. One illustrative example of a suitable handheld system is the 3Doodler®, a 3D printing pen from WobbleWorks LLC.

Figure 2:
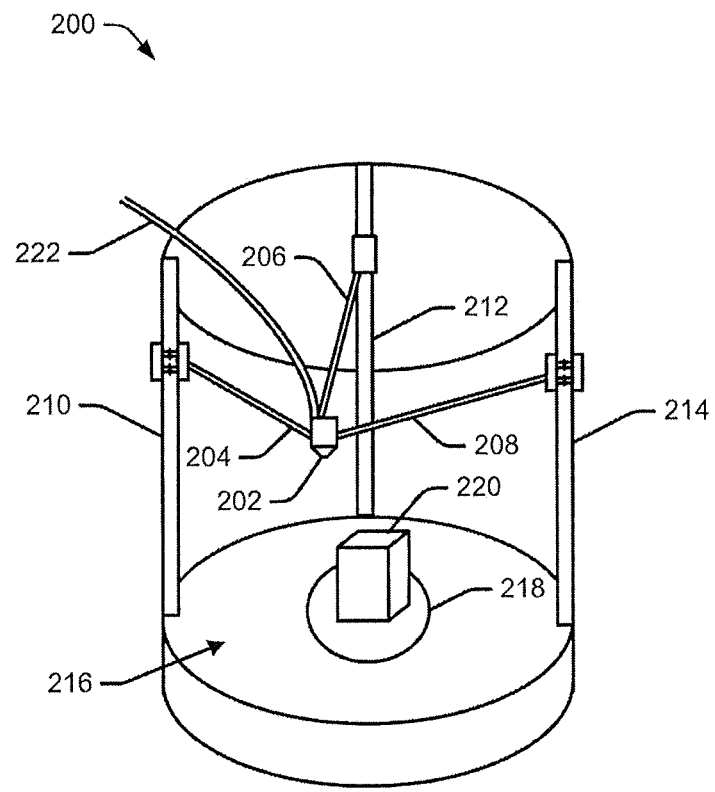
FIG. 2 illustrates example components of a second example additive manufacturing system.

FIG. 2 illustrates example components of a second example additive manufacturing system 200. The system 200 is similar to that of the additive manufacturing system 100 of FIG. 1, except that the system 200 is arranged in a delta machine configuration. Thus, some components of the system 200 are not shown in FIG. 2 and the details with respect to some of the components of the system 200 shown in FIG. 2 are omitted because the features of these components have been described previously in the description of FIG. 1.

The system 200 can include an extrusion head 202 that is coupled to a first arm 204, a second arm 206, and a third arm 208. The first arm 204 can be movably coupled to a first rail 210, the second arm 206 can be movably coupled to a second rail 212, and the third arm 208 can be movably coupled to a third rail 214. In addition, the extrusion head 214 can be coupled to the first arm 204, the second arm 206, and the third arm 208. Further, the system 200 can include a platform 216. Optionally, a substrate 218 can be disposed on the platform 216. In some cases, the substrate 218 can be removably attached to the platform 216.

The first arm 204, the second arm 206, and the third arm 208 can be controlled by a control system (not shown) to move in a manner that positions the extrusion head 202 to form an object 220. In particular, the first arm 204, the second arm 206, and the third arm 208 can move the extrusion head 202 according to a predetermined design to form layers of the object 220. The polymeric material used to produce the object 220 can be provided to the extrusion head 202 via a supply line 222. In some cases, the supply line 222 can feed a filament into the extrusion head 202 to produce the object 220.

Figure 3:
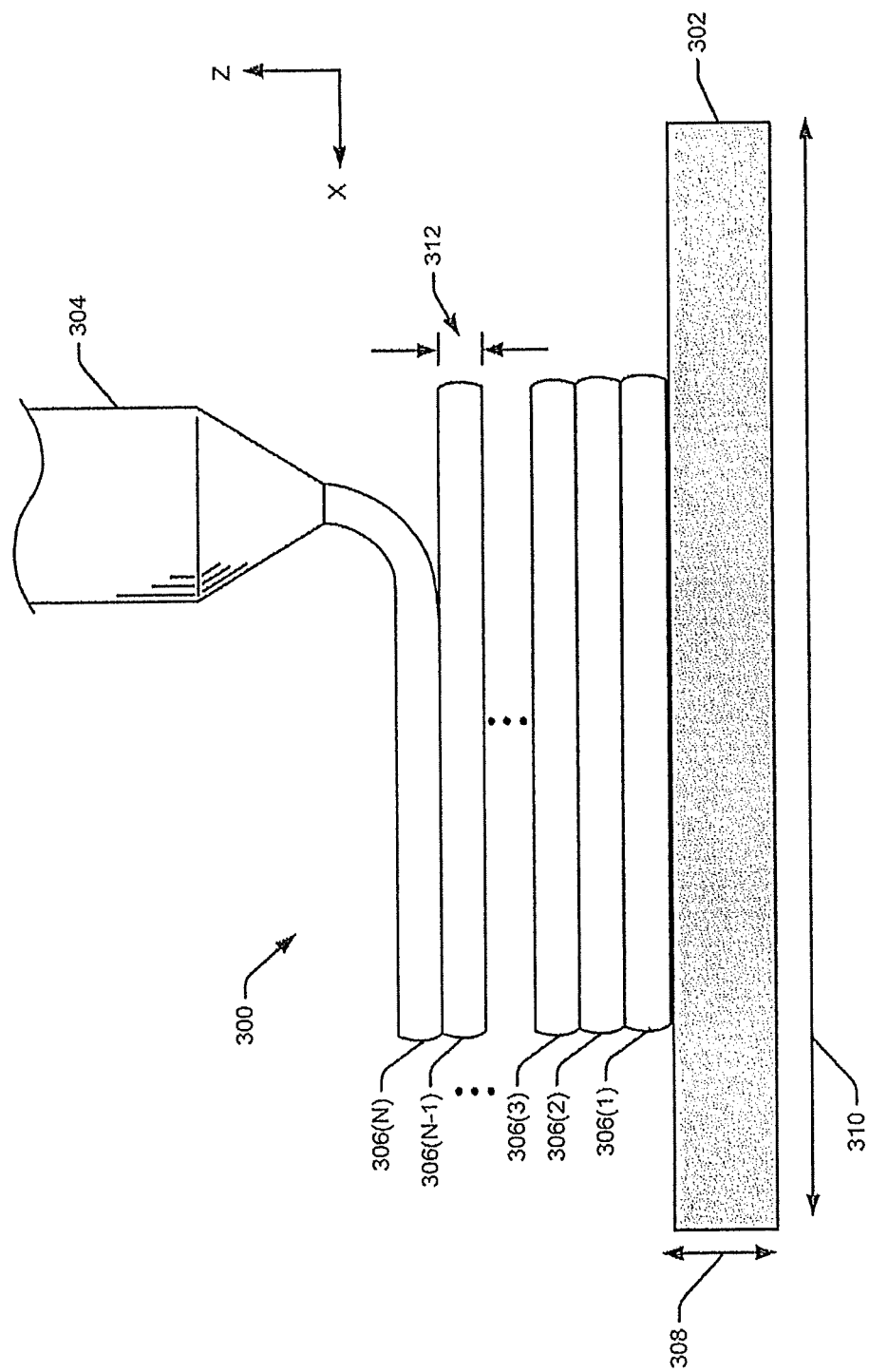
FIG. 3 illustrates a side view of multiple layers of an object being deposited onto a substrate during an additive manufacturing process.

FIG. 3 illustrates a side view of multiple layers of an object 300 being deposited onto a substrate 302 during an additive manufacturing process. As discussed previously with reference to FIG. 1 and FIG. 2, during the additive manufacturing process of forming an object on a substrate, build material is supplied to an extrusion head 304 and, optionally, the build material is heated. The build material is then deposited in roads onto a surface. In the illustrative example of FIG. 3, the build material is deposited directly onto the substrate 302. In other cases, the build material can be deposited onto a layer (not shown) disposed on the substrate 302, such as a layer that can be removed in order to separate the object 300 from the substrate 302. A first layer 306(1) of build material is shown as being deposited onto the substrate 302 according to a predetermined build path, which can represent a beginning of the additive manufacturing process. As the extrusion head 304 moves at a predetermined speed according to a predetermined design for the object 300, multiple additional layers 306(2), 306(3), 306(N−1), 306(N) of the build material can be deposited in a layer-by-layer fashion onto previously deposited layers to form the object 300 on the substrate 302. Depositing build material to form the layers 306(1)-306(N) can cause at least a partial interface to be formed between each of the layers 306(1)-306(N). The at least partial interface can be visible to a human eye without or with aid, such as a type of microscope. For example, an interface can be formed between the layer 306(1) and the layer 306(2). In another example, an interface can be formed between the layer 306(2) and the layer 306(3). The object 300 can be formed with 100% infill (i.e., a solid object), or with less than 100% infill (at least a partially hollow interior portion of the object 300).

The substrate 302 can include a glass material. In addition, the substrate 302 can include a polymeric material. In some cases, the substrate 302 can include a coating of the polymeric material. In other instances, the substrate 302 can be made substantially of the polymeric material. In an example, the substrate 302 can include a thermoplastic polymer. The substrate 302 can also include a polyester. Additionally, the substrate 302 can include a glycol-modified polyethylene terephthalate. Further, the substrate 302 can include a copolymer. To illustrate, the substrate 302 can include a copolyester. Optionally, the substrate 302 can include a polylactic acid, an acrylonitrile butadiene styrene copolymer, a polycarbonate, a polyamide, a polyetherimide, a polystyrene, a polyphenylsulfone, a polysulfone, a polyethersulfone, a polyphenylene, a poly(methyl methacrylate), or a combination thereof.

The build material for the object 300 can include one or more polymeric materials. The one or more polymeric materials can include any of the build materials described previously with respect to forming the object 102 of FIG. 1. In a particular example, the build material for the layers 306(1)-306(N) of the object 300 can comprise a copolyester having units of an acid component and units of a glycol component.

The build material used to form the layers 306(1)-306(N) can have particular physical properties that are conducive to forming objects in an additive manufacturing process. For example, the build material used to form the layers 306(1)-306(N) can have an inherent viscosity of at least about 0.4 dL/g, at least about 0.5 dL/g, at least about 0.55 dL/g, at least about 0.6 dL/g, or at least about 0.65 dL/g. Additionally, the build material used to form the layers 306(1)-306(N) can have an inherent viscosity of no greater than about 0.9 dL/g, no greater than about 0.8 dL/g, no greater than about 0.75 dL/g, or no greater than about 0.7 dL/g. In an illustrative example, the build material of the layers 306(1)-306(N) can have an inherent viscosity from about 0.4 dL/g to about 0.9 dL/g. In another illustrative example, the build material of the layers 306(1)-306(N) can have an inherent viscosity from about 0.5 dL/g to about 0.8 dL/g. In an additional illustrative example, the build material of the layers 306(1)-306(N) can have an inherent viscosity from 0.55 dL/g to about 0.7 dL/g. The inherent viscosity can be measured at about 25° C. in 100 ml of a 60/40 solution of phenol/tetrachlorethane including about 0.5 g of the polymer.

Additionally, the build material used to form the layers 306(1)-306(N) can have a glass transition temperature of at least about 70° C., at least about 72° C., at least about 75° C., at least about 78° C., or at least about 80° C. Additionally, the build material used to form the layers 306(1)-306(N) can have a glass transition temperature no greater than about 110° C., no greater than about 100° C., no greater than about 95° C., no greater than about 92° C., no greater than about 90° C., no greater than about 88° C., or no greater than about 85° C. In an illustrative example, the build material used to form the layers 306(1)-306(N) can have a glass transition temperature from about 70° C. to about 110° C. In another illustrative example, the build material used to form the layers 306(1)-306(N) can have a glass transition temperature from about 75° C. to about 100° C. In an additional illustrative example, the build material used to form the layers 306(1)-306(N) can have a glass transition temperature from about 80° C. to about 90° C. The glass transition temperature can be measured using a differential scanning calorimeter (DSC) at a scan rate of about 20° C.

Further, the build material used to form the layers 306(1)-306(N) can have a density of at least about 0.8 g/cm³, at least about 0.85 g/cm³, at least about 0.9 g/cm³, at least about 0.95 g/cm³, at least about 1 g/cm³, or at least about 1.05 g/cm³. Optionally, the build material used to form the layers 306(1)-306(N) can have a density no greater than about 1.35 g/cm$^3$, no greater than about 1.30 g/cm$^3$, no greater than about 1.25 g/cm$^3$, no greater than about 1.2 g/cm$^3$, no greater than about 1.15 g/cm$^3$, or no greater than about 1.1 g/cm$^3$. In an illustrative example, the build material used to form the layers 306(1)-306(N) can have a density from about 0.75 g/cm$^3$ to about 1.4 g/cm$^3$. In another illustrative example, the build material used to form the layers 306(1)-306(N) can have a density from about 0.9 g/cm$^3$ to about 1.3 g/cm$^3$. In a further illustrative example, the build material used to form the layers 306(1)-306(N) can have a density from about 1.15 g/cm$^3$ to about 1.25 g/cm$^3$. The density can be measured using the American Society for Testing and Materials (ASTM) D 792 standard as of the date of filing of this patent application.

Also, the build material used to form the layers 306(1)-306(N) can have a tensile strength at yield of at least about 30 MPa, at least about 35 MPa, at least about 40 MPa, at least about 45 MPa, or at least about 50 MPa. Further, the build material used to form the layers 306(1)-306(N) can have a tensile strength at yield no greater than about 80 MPa, no greater than about 75 MPa, no greater than about 70 MPa, no greater than about 65 MPa, no greater than about 60 MPa, or no greater than about 55 MPa. In an illustrative example, the build material used to form the layers 306(1)-306(N) can have a tensile strength at yield from about 25 MPa to about 100 MPa. In another illustrative example, the build material used to form the layers 306(1)-306(N) can have a tensile strength at yield from about 35 MPa to about 60 MPa. In an additional illustrative example, the build material used to form the layers 306(1)-306(N) can have a tensile strength at yield from about 45 MPa to about 55 MPa. The tensile strength at yield can be measured according to the ASTM D638 standard at the time of filing of this patent application.

The build material used to form the layers 306(1)-306(N) can also have an elongation at break of at least about 80%, at least about 95%, at least about 110%, at least about 125%, at least about 140%, or at least about 155%. In addition, the build material used to form the layers 306(1)-306(N) can have an elongation at break of no greater than about 230%, no greater than about 215%, no greater than about 200%, no greater than about 185%, or no greater than about 170%. In an illustrative example, the build material used to form the layers 306(1)-306(N) can have an elongation at break from about 75% to about 250%. In another illustrative example, the build material used to form the layers 306(1)-306(N) can have an elongation at break from about 95% to about 205%. In an additional illustrative example, the build material used to form the layers 306(1)-306(N) can have an elongation at break from about 80% to about 120%. In a further illustrative example, the build material used to form the layers 306(1)-306(N) can have an elongation at break from about 180% to about 220%. The elongation at break can be measured according to the ASTM D638 standard at the time of filing of this patent application.

Additionally, the build material used to form the layers 306(1)-306(N) can have a crystallization half time of at least about 80 minutes, at least about 90 minutes, at least about 100 minutes, at least about 110 minutes, at least about 120 minutes, or at least about 130 minutes. The build material used to form the layers 306(1)-306(N) can also have a crystallization half time of no greater than about 1000 minutes, no greater than about 1000 minutes, no greater than about 750 minutes, no greater than about 500 minutes, no greater than about 400 minutes, no greater than about 300 minutes, or no greater than about 200 minutes. In an illustrative example, the build material used to form the layers 306(1)-306(N) can have a crystallization half time from about 75 minutes to about 1000 minutes. In another illustrative example, the build material used to form the layers 306(1)-306(N) can have a crystallization half time from about 100 minutes to about 400 minutes. In a further illustrative example, the build material used to form the layers 306(1)-306(N) can have a crystallization half time from about 110 minutes to about 180 minutes. The crystallization half time can be measured using a small angle light scattering technique using a helium neon laser to measure the time at which the intensity of transmitted light drops to half of the maximum intensity achieved while cooling a sample to a predetermined temperature.

Optionally, the build material used to form the layers 306(1)-306(N) can have a zero shear viscosity of at least about 1800 poise, at least about 1900 poise, at least about 2000 poise, at least about 2100 poise, or at least about 2200 poise. Also, the build material used to form the layers 306(1)-306(N) can have a zero shear viscosity of no greater than about 7000 poise, no greater than about 5000 poise, no greater than about 3000 poise, no greater than about 2800 poise, no greater than about 2600 poise, or no greater than about 2400 poise. In an illustrative example, the build material used to form the layers 306(1)-306(N) can have a zero shear viscosity from about 1750 poise to about 8000 poise. In an additional illustrative example, the build material used to form the layers 306(1)-306(N) can have a zero shear viscosity from about 1800 poise to about 4000 poise. In a further illustrative example, the build material used to form the layers 306(1)-306(N) can have a zero shear viscosity from about 1900 poise to about 3000 poise. The zero shear viscosity can be measured using small amplitude oscillatory shear techniques with a frequency sweep from about 1 rad/s to about 400 rad/s at 260° C. using a 10% strain value where the viscosity measured at 1 rad/s indicates the zero shear viscosity.

The build material used to form the layers 306(1)-306(N) can have a flexural modulus of at least about 1700 MPa, at least about 1750 MPa, at least about 1800 MPa, at least about 1850 MPa, or at least about 1900 MPa. Further, the build material used to form the layers 306(1)-306(N) can have a flexural modulus of no greater than about 2100 MPa, no greater than about 2050 MPa, no greater than about 2000 MPa, or no greater than about 1950 MPa. In an illustrative example, the build material used to form the layers 306(1)-306(N) can have a flexural modulus from about 1700 MPa to about 2100 MPa. In another illustrative example, the build material used to form the layers 306(1)-306(N) can have a flexural modulus from about 1775 MPa to about 1975 MPa. The flexural modulus can be determined according to the ASTM D790 standard at the time of filing of this patent application.

The build material used to form the layers 306(1)-306(N) can have a notched Izod impact strength of at least about 60 J/m, at least about 62 J/m, at least about 64 J/m, at least about 66 J/m, or at least about 68 J/m. In addition, the build material used to form the layers 306(1)-306(N) can have a notched Izod impact strength of no greater than about 82 J/m, no greater than about 80 J/m, no greater than about 78 J/m, no greater than about 76 J/m, no greater than about 74 J/m, or no greater than about 72 J/m. In an illustrative example, the build material used to form the layers 306(1)-306(N) can have a notched Izod impact strength from about 60 J/m to about 85 J/m. In another illustrative example, the build material used to form the layers 306(1)-306(N) can have a notched Izod impact strength from about 65 J/m to about 75 J/m. The notched Izod impact strength can be determined according to the ASTM D256 standard at 23° C. at the time of filing of this patent application.

Also, the build material used to form the layers 306(1)-306(N) can have a heat deflection temperature of at least about 52° C., at least about 54° C., at least about 56° C., at least about 58° C., or at least about 60° C. Further, the build material used to form the layers 306(1)-306(N) can have a heat deflection temperature of no greater than about 72° C., no greater than about 70° C., no greater than about 68° C., no greater than about 66° C., no greater than about 64° C., or no greater than about 62° C. In an illustrative example, the build material used to form the layers 306(1)-306(N) can have a heat deflection temperature from about 50° C. to about 72° C. In another illustrative example, the build material used to form the layers 306(1)-306(N) can have a heat deflection temperature from about 55° C. to about 65° C. The heat deflection temperature can be determined according to the ASTM D648 standard at about 264 psi at the time of filing of this patent application.

The values of the physical properties of the build material used to form the layers 306(1)-306(N) are conducive to forming objects, such as the object 300, using an extrusion-based additive manufacturing process. For example, build material used to form the layers 306(1)-306(N) can have a crystallization half time of at least 100 minutes to minimize or eliminate the formation of haze in objects formed from the build materials and to minimize shrinkage due to crystalline behavior in objects formed from the build materials. Additionally, build materials used to form the layers 306(1)-306(N) can have values for zero shear viscosity that enable the formation of objects using the build materials at relatively low temperatures, such as less than 250° C. Build materials having values of zero shear viscosity as described herein can also reduce an amount of pressure in the extrusion head, which can facilitate the formation of objects using extrusion-based additive manufacturing on less robust equipment, that is, on equipment that is not fitted to be able to withstand processing conditions under relatively high pressure. Furthermore, the values of the glass-transition temperature and the values of the density of the build materials used to form the layers 306(1)-306(N) impart heating and cooling characteristics of the build material within the extrusion head 304 and outside of the extrusion head 304 such that the build material can flow through the extrusion head 304, while solidifying once deposited onto the substrate 302 or another layer such that defects of the object 300 are minimized. The build material used to form the layers 306(1)-306(N) can also have an elongation at break that causes the build material to have minimal brittleness after extrusion. In addition, the build material used to form the layers 306(1)-306(N) can have an inherent viscosity that minimizes an amount of heat applied to the build material to cause the build material to flow and be extruded. Extrusion of the build material at minimized temperatures reduces degradation of the build material during extrusion and minimizes shrinkage of the build material after extrusion. The inherent viscosity of the build material used to form the layers 306(1)-306(N) can also enable appropriate flow of the build material through the extrusion head 304 and cause the object 300 to have a particular amount of strength after being formed.

The substrate 302 can have a thickness 308 and a length 310. The substrate 302 can also have a width that is perpendicular to the length 310. The substrate 302 can be of various shapes, including square, circular, rectangular, triangular, or any suitable polygonal shape.

The thickness 308 of the substrate 302 can be at least about 0.5 mm, at least about 1 mm, or at least about 2 mm. Additionally, the thickness 308 of the substrate 302 can be no greater than about 5 mm, no greater than about 4 mm, or no greater than about 3 mm. In an illustrative example, the thickness 308 of the substrate 302 can be included in a range of about 0.7 mm to about 4 mm. In another illustrative example, the thickness 308 of the substrate 302 can be included within a range of about 1 mm to about 2 mm.

The length 310 of the substrate 302 can be at least about 40 mm, at least about 80 mm, at least about 120 mm, or at least about 150 mm. Additionally, the length 310 of the substrate 302 can be no greater than about 500 mm, no greater than about 400 mm, no greater than about 300 mm, no greater than about 250 mm, or no greater than about 200 mm. In an illustrative example, the length 310 of the substrate 302 can be included in a range of about 30 mm to about 600 mm. In another illustrative example, the length 310 of the substrate 302 can be included in a range of about 40 mm to about 250 mm. In an additional illustrative example, the length 310 of the substrate 302 can be included in a range of about 50 mm to about 200 mm.

Further, a width of the substrate 302 can be at least about 35 mm, at least about 75 mm, at least about 125 mm, or at least about 160 mm. The width of the substrate 302 can also be no greater than about 480 mm, no greater than about 390 mm, no greater than about 310 mm, no greater than about 250 mm, or no greater than about 210 mm. In an illustrative example, the width of the substrate 302 can be included in a range of about 30 mm to about 600 mm. In another illustrative example, the width of the substrate 302 can be included in a range of about 40 mm to about 250 mm. In an additional illustrative example, the width of the substrate 302 can be included in a range of about 50 mm to about 200 mm. In some examples, a square-shaped substrate 302 can have a width of from about 100 mm to about 200 mm and have the length 312 of from about 100 mm to about 200 mm.

The thickness (in the Z-direction of FIG. 3), of each of the layers 306(1)-(N) of the object 300, such as a thickness 312, can be a value that provides a specified resolution to the object 300. That is, layers having relatively greater values for thickness can result in a noticeably rigid or jagged outer surface of the object 300 (i.e., lower resolution object), while layers having relatively lower values for thickness can make the separate layers inconspicuous and the object 300 can have a smoother outer surface in both appearance and feel (i.e., a higher resolution object). Furthermore, each of the layers 306(1)-(N) can be of substantially uniform thicknesses or of varying thicknesses.

A representative layer of the layers 306(1)-306(N), such as the layer 306(N−1), can have a thickness 312 that is from about 5 micrometers to about 2000 micrometers. In some cases, the thickness 312 can be from about 10 micrometers to about 1000 micrometers. Additionally, the thickness 312 can be from about 25 micrometers to about 500 micrometers. The thickness 312 can also be from about 35 micrometers to about 250 micrometers.

The material of the substrate 302 and the build material of the layers 306(1)-306(N) are selected to provide adhesion between the respective layers. For example, the material of the substrate 302 and the material of the layer 306(1) can be selected to provide sufficient adhesion between the substrate 302 and the layer 306(1) such that the layer 306(1) remains on the substrate 302 during the formation of the object 300 while being removed from the substrate 302 with minimal, if any, damage to the object 300 or the substrate 302. Additionally, the build material of the layers 306(1)-306(N)

can be selected such that any movement of the layers 306(1)-306(N) is minimized to avoid or reduce any deformation of the object 300.

Figure 4:
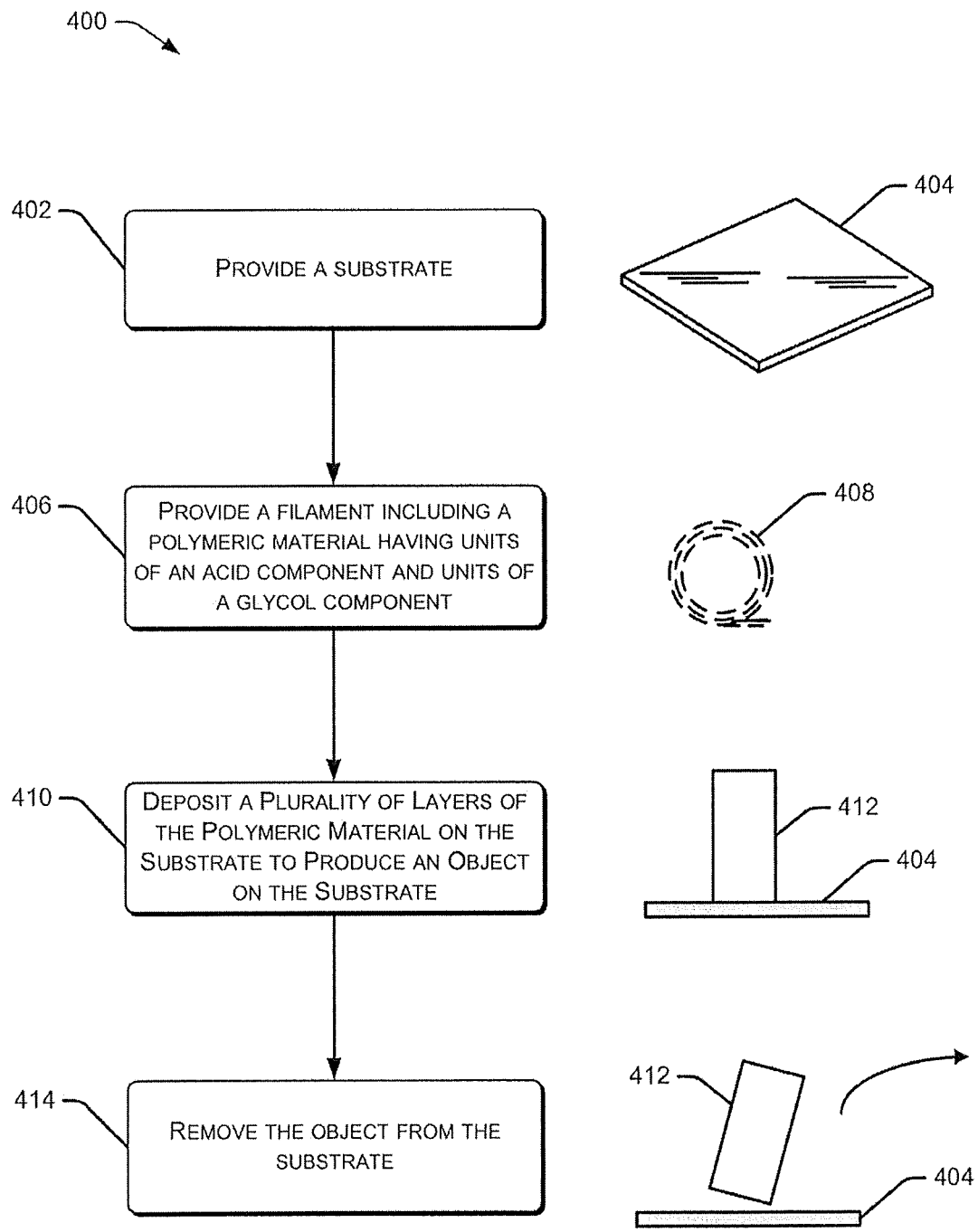
FIG. 4 is a flow diagram of an example process of forming an object on a substrate by depositing a plurality of layers of a polymeric material onto a substrate and removing the object from the substrate.

FIG. 4 is a flow diagram of an example process 400 of forming an object on a substrate by depositing a plurality of layers of a polymeric material onto a substrate and removing the object from the substrate. The process 400 is illustrated as a collection of blocks in a logical flow graph, which represent a sequence of operations that can be implemented, at least in part, by an extrusion-based additive manufacturing system, such as the additive manufacturing system 100 of FIG. 1, the additive manufacturing system 200 of FIG. 2, or both. The order in which the operations are described is not intended to be construed as a limitation, and any number of the described blocks can be combined in any order and/or in parallel to implement the process.

At 402, a substrate 404 can be provided for forming thereon an object using an additive manufacturing process. The substrate 404 can be the same as or similar to the substrate 104 of FIG. 1, the substrate 204 of FIG. 2, or the substrate 302 of FIG. 3. In some examples, the providing the substrate 404 at 402 can comprise removably mounting or attaching a preformed substrate 404 to a platform, such as the platform 106 of FIG. 1. In other examples, providing the substrate 404 at 402 can further comprise producing the substrate 404 by a suitable manufacturing technique, such as injection-molding, extrusion, blow-molding, compression molding, casting, or any other suitable method of making the substrate 402.

At 406, a filament 408 formed from a polymeric material including units of an acid component and units of a glycol component can be provided. In some cases, providing the filament 408 at 406 can include combining a diacid component and a glycol component to form the polymeric material. For example, one or more diacids and one or more glycols can be mixed together. In some cases, the one or more diacids and the one or more glycols can be in the form of pellets, powder, or some combination thereof. In a particular example, pellets of at least one of the diacid component or the glycol component can be subjected to a grinding operation before being combined. The units of the acid component can be derived from one or more acids and the units of the glycol component can be derived from one or more glycols. In a particular example, the polymeric material can be produced via a condensation reaction between one or more acids and one or more glycols.

In some cases, the acid component of the polymeric material can include units derived from one or more dibasic acids. For example, the acid component can include units derived from a terephthalic acid, units derived from an isophthalic acid, units derived from a cyclohexanedicarboxylic acid, units derived from a naphthalene dicarboxylic acid, units derived from a stilbenedicarboxylic acid, or combinations thereof. Optionally, the acid component can be comprised of from about 40 mole % to about 60 mole % of units derived from a first acid and from about 40 mole % to about 60 mole % of units derived from a second acid. In a particular example, the acid component can be comprised of from about 45 mole % to about 55 mole % of units derived from terephthalic acid and from about 45 mole % to about 55 mole % of units derived from isophthalic acid.

Additionally, the glycol component can include units derived from cyclohexamedimethanol. Further, the glycol component can include units derived from one or more additional glycols, such as ethylene glycol, 1,2-propanediol, 1,3-propanediol, neopentyl glycol, 1,4-butanediol, 1,5-pentatnediol, 1,6-hexanediol, p-xylene glycol, 2,2,4,4-Tetramethyl-1,3-cyclobutanediol, or combinations thereof. In some cases where the polymeric material includes units derived from multiple glycols, the glycol component can include from about 75 mole % to about 98 mole % of units derived from a first glycol and from about 2 mole % to about 25 mole % of units derived from one or more second glycols.

The polymeric material of the filament 408 can also include additives, such as stabilizers, antioxidants, fillers, branching agents, pigments, dyes, combinations thereof, and the like.

Optionally, the polymeric material can have an intrinsic viscosity from about 0.55 dL/g to about 0.7 dL/g, a density no greater than about 1.25 g/cm$^3$, a glass transition temperature of at least about 80° C., and a crystallization half-time no greater than about 300 minutes. Also, the polymeric material can have a zero shear viscosity no greater than about 3000 Poise. Further, the polymeric material can have an elongation at break of at least about 75%.

After combining the diacid component and the glycol component to form the polymeric material, the polymeric material can be extruded to form the filament 408. In some cases, the polymeric material can be fed into the extruder in the form of pellets, while in other cases, the polymeric material can be fed into the extruder as a powder. In particular, the filament 408 of the build material can be produced using an extruder, such as a single screw extruder, in some instances, or a twin screw extruder, in other instances. In some cases, the extruder can include a melt pump, while in other cases, a melt pump can be absent from the extruder. When a single screw extruder or a twin screw extruder is used to produce the filament 408, the screw(s) of the extruders can be operated at a speed from about 50 rotations per minute to about 200 rotations per minute. In an illustrative example, the speed of the single screw extruder or the twin screw extruder can be from about 75 rotations per minute to about 175 rotations per minute. In another illustrative example, the speed of the single screw extruder or the twin screw extruder can be from 60 rotations per minute to 85 rotations per minute. In addition, a feed rate into the extruder of one or more materials used to form the filament 408 can be from 10 grams/minute to 40 grams/minute, from 15 grams/minute to 35 grams/minute, from 20 grams/minute to 30 grams per minute, or from 15 grams/minute to 25 grams/minute.

The extruder can include one or more chambers and the mixture of materials used to form the filament 408 can be heated in one or more chambers of the extruder. For example, heat can be applied to the polymeric material in a first chamber of the extruder at a first temperature from 100° C. to 180° C., from 110° C. to 160° C., or from 120° C. to 140° C. Also, heat can be applied to the polymeric material used to form the filament 408 in a second chamber of the extruder at a second, different temperature, such as from 160° C. to 260° C., from 190° C. to 250° C., from 200° C. to 240° C., or from 210° C. to 230° C. When the extruder includes more than two chambers, heat can be applied to the polymeric material used to form the filament 408 in one or more additional chambers of the extruder at the first temperature or the second temperature. In an illustrative example, heat can be applied to the polymeric material used to form the filament 408 in one or more chambers of the extruder at a temperature from about 210° C. to about 240° C.

The filament 408 can have a diameter from about 1 mm to about 5 mm and a length of at least about 3 cm. In some cases, the filament 408 can have a length of at least about 5 cm. In some cases, the filament 408 can have a length of at least about 30 cm. In some cases, the filament 408 can have a length from about 3 cm to about 5 m. In some cases, the filament 408 can have a length from about 30 cm to about 5 m. Additionally, the filament 408 can have a length that is greater than 5 m. In a particular example, the filament 408 can have a body with a diameter from about 1.5 mm to about 3 mm and a length of at least about 2 m.

At 410, a plurality of layers of the polymeric material can be deposited onto the substrate 404 to produce an object 412. For example, the one or more layers of the polymeric material can be extruded onto the substrate 404 via an extrusion head according to a predetermined design to form the object 412. To illustrate, the depositing of the one or more layers of the polymeric material onto the substrate 404 can occur based on a predetermined design to build the object 412 in a layer-by-layer fashion according to 3D model data processed by an additive manufacturing system. In some cases, an amount of the polymeric material can be heated at a temperature from about 190° C. to about 270° C. before depositing the amount of the polymeric material onto the substrate 404.

In addition, in depositing the plurality of layers of the filament 408 onto the substrate 404, the polymeric material can be deposited at a specified rate. In some cases, the filament 408 can be extruded onto the substrate 404 to produce the plurality of layers of the object. In these cases, the rate at which the filament 408 is extruded can be referred to as the "rate of extrusion." In an illustrative example, the rate at which the filament 408 is deposited onto the substrate 404 during the formation of the object 412 can be from about 5.5 mm$^3$/s to about 9.5 mm$^3$/s. In another illustrative example, the rate at which the filament 408 is deposited onto the substrate 404 during the formation of the object 412 can be from about 6.5 mm$^3$/s to about 9.0 mm$^3$/s. In an additional illustrative example, the rate at which the filament 408 is deposited onto the substrate 404 during the formation of the object 412 can be from about 7.6 mm$^3$/s to about 8.7 mm$^3$/s.

The object 412 can have an inherent viscosity of at least about 0.4 dL/g, at least about 0.45 dL/g, at least about 0.50 dL/g, at least about 0.55 dL/g, or at least about 0.60 dL/g. Additionally, the object 412 can have an inherent viscosity of no greater than about 0.90 dL/g, no greater than about 0.85 dL/g, no greater than about 0.80 dL/g, no greater than about 0.75 dL/g, no greater than about 0.70 dL/g, or no greater than about 0.65 dL/g. In an illustrative example, the object 412 can have an inherent viscosity from about 0.35 dL/g to about 1.00 dL/g. In another illustrative example, the object 412 can have an inherent viscosity from about 0.50 dL/g to about 0.80 dL/g. In an additional illustrative example, the object 412 can have an inherent viscosity from about 0.55 dL/g to about 0.70 dL/g. The inherent viscosity of the object 412 can be measured in approximately a 60/40 solution of phenol/tetrachloroethane at a concentration of about 0.5 g/100 ml at about 25° C.

In some cases, the object 412 can have a minimal loss of inherent viscosity relative to an inherent viscosity of the polymeric material used to produce the object 412. In particular, an inherent viscosity loss with inherent viscosity abbreviated as I.V. in the equation below can be expressed as:

$$\text{I.V. loss} = \frac{\text{polymeric material I.V.} - \text{object I.V.}}{\text{polymeric material I.V.}} \times 100$$

In particular, the object 412 can have an inherent viscosity loss of no greater than about 6%, no greater than about 5%, no greater than about 4%, no greater than about 3%, no greater than about 2%, no greater than about 1.5%, no greater than about 1.3%, no greater than about 1.1%, no greater than about 1%, no greater than about 0.9%, no greater than about 0.7%, or no greater than about 0.5%. In some cases, the object can have substantially no inherent viscosity loss. In an illustrative example, the object 412 can have an inherent viscosity loss from about 0.01% to about 10%. In another illustrative example, the object 412 can have an inherent viscosity loss from about 0.05% to about 8%. In an additional illustrative example, the object 412 can have an inherent viscosity loss from about 0.10% to about 5%. In a further illustrative example, the object 412 can have an inherent viscosity loss from about 0.5% to about 2%.

Optionally, inherent viscosity loss can depend on a temperature at which the polymeric material of the filament 408 is heated as the layers of the polymeric material are deposited onto the substrate 404 during the formation of the object 412. To illustrate, when the object 412 is formed at a temperature of about 225° C., an inherent viscosity loss of the object 412 relative to the polymeric material of the filament 408 can be no greater than about 2.5%, no greater than about 2.1%, no greater than about 1.7%, no greater than about 1.5%, no greater than about 1.3%, no greater than about 1.1%, no greater than about 0.9%, no greater than about 0.7%, no greater than about 0.5%, no greater than about 0.3%, or no greater than about 0.1%. In some cases, when the object 412 is formed at a temperature of about 225° C., there can be substantially no inherent viscosity loss of the object 412 relative to the polymeric material of the filament 408. In an illustrative example, when the object 412 is formed at a temperature of about 225° C., an inherent viscosity loss of the object 412 relative to the polymeric material of the filament 408 can be from about 0.01% to about 3%. In another illustrative example, when the object 412 is formed at a temperature of about 225° C., an inherent viscosity loss of the object 412 relative to the polymeric material of the filament 408 can be from about 0.04% to about 2.50%. In an additional illustrative example, when the object 412 is formed at a temperature of about 225° C., an inherent viscosity loss of the object 412 relative to the polymeric material of the filament 408 can be from about 0.1% to about 2%.

Additionally, when the object 412 is formed at a temperature of about 230° C., an inherent viscosity loss of the object 412 relative to the polymeric material of the filament 408 can be no greater than about 5.5%, no greater than about 5.0%, no greater than about 4.5%, no greater than about 4%, no greater than about 3.5%, no greater than about 3%, no greater than about 2.5%, no greater than about 2.0%, no greater than about 1.5%, no greater than about 1.0%, no greater than about 0.9%, no greater than about 0.7%, no greater than about 0.5%, no greater than about 0.3%, or no greater than about 0.1%. In some cases, when the object 412 is formed at a temperature of about 230° C., there can be substantially no inherent viscosity loss of the object 412 relative to the polymeric material of the filament 408. In an illustrative example, when the object 412 is formed at a temperature of about 230° C., an inherent viscosity loss of the object 412 relative to the polymeric material of the filament 408 can be from about 0.01% to about 6%. In another illustrative example, when the object 412 is formed at a temperature of about 230° C., an inherent viscosity loss of the object 412 relative to the polymeric material of the filament 408 can be from about 0.04% to about 2.50%. In an additional illustrative example, when the object 412 is formed at a temperature of about 230° C., an inherent viscosity loss of the object 412 relative to the polymeric material of the filament 408 can be from about 0.1% to about 2%.

Further, when the object 412 is formed at a temperature of about 240° C., an inherent viscosity loss of the object 412 relative to the polymeric material of the filament 408 can be no greater than about 6%, no greater than about 5.5%, no greater than about 5%, no greater than about 4.5%, no greater than about 4%, no greater than about 3.5%, no greater than about 3%, no greater than about 2.5%, no greater than about 2%, no greater than about 1.9%, no greater than about 1.7%, no greater than about 1.5%, no greater than about 1.3%, no greater than about 1.1%, or no greater than about 0.9%. In an illustrative example, when the object 412 is formed at a temperature of about 240° C., an inherent viscosity loss of the object 412 relative to the polymeric material of the filament 408 can be from about 0.8% to about 6%. In another illustrative example, when the object 412 is formed at a temperature of about 240° C., an inherent viscosity loss of the object 412 relative to the polymeric material of the filament 408 can be from about 1% to about 4%. In an additional illustrative example, when the object 412 is formed at a temperature of about 240° C., an inherent viscosity loss of the object 412 relative to the polymeric material of the filament 408 can be from about 1.1% to about 2.1%.

Also, when the object 412 is formed at a temperature of about 250° C., an inherent viscosity loss of the object 412 relative to the polymeric material of the filament 408 can be no greater than about 7.5%, no greater than about 7%, no greater than about 6.5%, no greater than about 6%, no greater than about 5.5%, no greater than about 5%, no greater than about 4.5%, no greater than about 4%, no greater than about 3.5%, no greater than about 3%, no greater than about 2.5%, no greater than about 2%, no greater than about 1.9%, no greater than about 1.7%, or no greater than about 1.5%. In an illustrative example, when the object 412 is formed at a temperature of about 250° C., an inherent viscosity loss of the object 412 relative to the polymeric material of the filament 408 can be from about 2.3% to about 7.5%. In another illustrative example, when the object 412 is formed at a temperature of about 250° C., an inherent viscosity loss of the object 412 relative to the polymeric material of the filament 408 can be from about 2.7% to about 6.1%. In an additional illustrative example, when the object 412 is formed at a temperature of about 250° C., an inherent viscosity loss of the object 412 relative to the polymeric material of the filament 408 can be from about 2.8% to about 5.1%.

Furthermore, inherent viscosity loss can depend on a rate at which the polymeric material of the filament 408 is deposited onto the substrate 404 during the formation of the object 412. For example, when the filament 408 is deposited onto the substrate 404 during the formation of the object 412 at a rate from about 7 mm$^3$/s to about 8 mm$^3$/s, an inherent viscosity loss of the object 412 relative to the polymeric material of the filament 408 can be no greater than about 5%, no greater than about 4.5%, no greater than about 4%, no greater than about 3.5%, no greater than about 3%, no greater than about 2.5%, no greater than about 2%, no greater than about 1.5%, no greater than about 1%, no greater than about 0.9%, no greater than about 0.7%, no greater than about 0.5%, no greater than about 0.3%, or no greater than about 0.1%. In some cases, when the filament 408 is deposited onto the substrate 404 during the formation of the object 412 at a rate from about 7 mm$^3$/s to about 8 mm$^3$/s, there can be substantially no inherent viscosity loss of the object 412 relative to the polymeric material of the filament 408. In an illustrative example, when the filament 408 is deposited onto the substrate 404 during the formation of the object 412 at a rate from about 7 mm$^3$/s to about 8 mm$^3$/s, an inherent viscosity loss of the object 412 relative to the polymeric material of the filament 408 can be from about 0.01% to about 6%. In another illustrative example, an inherent viscosity loss of the object 412 relative to the polymeric material of the filament 408 can be from about 0.7% to about 4.3%. In an additional illustrative example, when the filament 408 is deposited onto the substrate 404 during the formation of the object 412 at a rate from about 7 mm$^3$/s to about 8 mm$^3$/s, an inherent viscosity loss of the object 412 relative to the polymeric material of the filament 408 can be from about 0.9% to about 2.5%.

In addition, when the filament 408 is deposited onto the substrate 404 during the formation of the object 412 at a rate from about 8 mm$^3$/s to about 9 mm$^3$/s, an inherent viscosity loss of the object 412 relative to the polymeric material of the filament 408 can be no greater than about 5%, no greater than about 4.5%, no greater than about 4%, no greater than about 3.5%, no greater than about 3%, no greater than about 2.5%, no greater than about 2%, no greater than about 1.5%, no greater than about 1%, no greater than about 0.9%, no greater than about 0.7%, no greater than about 0.5%, no greater than about 0.3%, or no greater than about 0.1%. In some cases, when the filament 408 is deposited onto the substrate 404 during the formation of the object 412 at a rate from about 8 mm$^3$/s to about 9 mm$^3$/s, there can be substantially no inherent viscosity loss of the object 412 relative to the polymeric material of the filament 408. In an illustrative example, when the filament 408 is deposited onto the substrate 404 during the formation of the object 412 at a rate from about 8 mm$^3$/s to about 9 mm$^3$/s, an inherent viscosity loss of the object 412 relative to the polymeric material of the filament 408 can be from about 0.01% to about 4%. In another illustrative example, when the filament 408 is deposited onto the substrate 404 during the formation of the object 412 at a rate from about 8 mm$^3$/s to about 9 mm$^3$/s, an inherent viscosity loss of the object 412 relative to the polymeric material of the filament 408 can be from about 0.1% to about 3.3%. In an additional illustrative example, when the filament 408 is deposited onto the substrate 404 during the formation of the object 412 at a rate from about 8 mm$^3$/s to about 9 mm$^3$/s, an inherent viscosity loss of the object 412 relative to the polymeric material of the filament 408 can be from about 0.2% to about 0.9%.

In a particular example, when the object 412 is formed at a temperature of about 230° C. and when the filament 408 is deposited onto the substrate 404 during the formation of the object 412 at a rate from about 7 mm$^3$/s to about 8 mm$^3$/s, an inherent viscosity loss of the object 412 relative to the polymeric material of the filament 408 can be no greater than about 5.5%, such as from about 0.7% to about 5.3%. In another particular example, when the object 412 is formed at a temperature of about 240° C. and when the filament 408 is deposited onto the substrate 404 during the formation of the object 412 at a rate from about 7 mm$^3$/s to about 8 mm$^3$/s, an inherent viscosity loss of the object 412 relative to the polymeric material of the filament 408 can be no greater than about 5.5%, such as from about 1.5% to about 5.3%. In an additional particular example, when the object 412 is formed at a temperature of about 250° C. and when the filament 408 is deposited onto the substrate 404 during the formation of the object 412 at a rate from about 7 mm³/s to about 8 mm³/s, an inherent viscosity loss of the object 412 relative to the polymeric material of the filament 408 can be no greater than about 7.1%, such as from about 2.7% to about 6.8%.

Also, when the object 412 is formed at a temperature of about 230° C. and when the filament 408 is deposited onto the substrate 404 during the formation of the object 412 at a rate from about 8 mm³/s to about 9 mm³/s, an inherent viscosity loss of the object 412 relative to the polymeric material of the filament 408 can be no greater than about 2.5%, such as from about 0.1% to about 2.3%. Additionally, when the object 412 is formed at a temperature of about 240° C. and when the filament 408 is deposited onto the substrate 404 during the formation of the object 412 at a rate from about 8 mm³/s to about 9 mm³/s, an inherent viscosity loss of the object 412 relative to the polymeric material of the filament 408 can be no greater than about 3.5%, such as from about 0.9% to about 3.3%. Further, when the object 412 is formed at a temperature of about 250° C. and when the filament 408 is deposited onto the substrate 404 during the formation of the object 412 at a rate from about 8 mm³/s to about 9 mm³/s, an inherent viscosity loss of the object 412 relative to the polymeric material of the filament 408 can be no greater than about 6.1%, such as from about 2.5% to about 5.7%.

Inherent viscosity loss can indicate an amount of degradation of a material that occurs during an additive manufacturing process. The loss of inherent viscosity can cause a change in mechanical properties of a material. In some case, the change in mechanical properties can result in an object produced using an additive manufacturing process being brittle.

Further, the object 412 can have a notched Izod test value from about 35 kJ/m² to about 60 kJ/m². In another example, the object 412 can have a notched Izod test value from about 40 kJ/m² to about 55 kJ/m². In an additional example, the object 412 can have a notched Izod test value from about 45 kJ/m² to about 50 kJ/m². The notched Izod test value of the object 412 can be measured according to the ASTM D256 standard at the time of filing of this patent application.

At 414, the object 412 can be removed from the substrate 404. In some cases, a machine, such as a robotic arm, can be used to remove the object 412 from the substrate 404. In other cases, an individual can remove the object 412 from the substrate 404 by using a hand or tool.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

The concepts described herein will be further described in the following examples with reference to the following figures, which do not limit the scope of the disclosure described in the claims.

EXAMPLES

Example 1

Samples of polymeric materials were prepared having the compositions described in Table 1. Samples 1 and 2 were formed according to techniques described herein and Samples 3 and 4 were prepared as comparative examples. In addition to the components shown in Table 1, Sample 4 also included a trimellitic anhydride branching agent. The composition of the samples was determined using proton nuclear magnetic resonance spectroscopy (NMR).

TABLE 1

| Compositions for Samples 1-4 | | | | |
|---|---|---|---|---|
| | Sample 1 | Sample 2 | Sample 3 | Sample 4 |
| Cyclohexanedimethanol | 100 mole % | 31 mole % | 31 mole % | 31 mole % |
| Ethylene Glycol | 0 mole % | 69 mole % | 69 mole % | 69 mole % |
| Terephthalic Acid | 52 mole % | 100 mole % | 100 mole % | 100 mole % |
| Isophthalic Acid | 48 mole % | 0 mole % | 0 mole % | 0 mole % |

Some of the characteristics of the samples were measured according to ASTM D standards. The results of the sample measurements are shown in Table 2.

TABLE 2

| Physical Property Measurements for Samples 1-4 | | | | |
|---|---|---|---|---|
| | Sample 1 | Sample 2 | Sample 3 | Sample 4 |
| Density (g/cm³) | 1.20 | 1.28 | 1.28 | 1.27 |
| Inherent Viscosity (dL/g) | 0.64 | 0.59 | 0.75 | 0.75 |
| Glass Transition Temperature (° C.) | 84 | 78 | 78 | 78 |
| Crystallization Half-Time (minutes) | 128 | >1500 | >1500 | >1500 |
| Zero Shear Viscosity (Poise) | 2750 | 2810 | — | — |
| Heat Deflection Temperature (° C.) | 63 | 62 | 62 | 62 |
| Tensile Strength at Yield (MPa) | 50 | 51 | 51 | 50 |
| Elongation at Break (%) | 193 | 33 | 33 | 110 |
| Flexural Modulus (MPa) | 1814 | 2007 | 2007 | 2100 |
| Notched Izod Impact Strength (J/m) | 70 | 69 | 98 | 95 |

The density of the samples was measured using the ASTM D 792 standard at the time of filing of this patent application. In addition, the inherent viscosity of the samples was measured in approximately a 60/40 solution of phenol/tetrachloroethane at a concentration of about 0.5 g/100 ml at about 25° C. In addition, the glass transition temperature of the samples was measured using a TA Instruments differential scanning calorimeter (DSC) at a scan rate of about 20° C.

The crystallization half-time of the samples was measured using a small angle light scattering (SALS) technique with a helium-neon laser. In particular, the sample was melted at about 280° C. to remove preexisting crystallinity. The sample was then rapidly cooled to a predetermined crystallization temperature from about 140° C. to about 160° C. and the transmitted light intensity was recorded as a function of time. The time at which the light intensity drops to half the original value denotes the crystallization half-time.

The zero shear viscosity of the samples was measured using small amplitude oscillatory shear (SAOS) rheology conducted with RDA II from Rheometrics Scientific. A frequency sweep from about 1 to about 400 rad/s was performed at about 260° C. using about a 10% strain value. The samples exhibited a Newtonian-like plateau in the 1-10 rad/s shear rate regime. The viscosity measured at about 1 rad/s was reported as the zero-shear viscosity.

For the remaining tests, an ASTM test bar was molded on a Toyo 90 injection molding machine. The pellets of the samples were first dried at about 70° C. for about 3-6 hours. The molding melt temperature was about 260° C. and the mold temperature was about 30° C. The heat deflection temperature of the samples was measured at about 264 psi according to the ASTM D 648 standard at the time of filing this patent application. In addition, the flexural modulus was measured according to the ASTM D 790 standard at the time of filing this patent application. Further, the tensile strength at yield and the elongation at break were measured according to the ASTM D 638 standard at the time of filing of this patent application. Also, the notched Izod impact strength of the samples were measured at about 23° C. according to the ASTM D 256 standard at the time of filing of this patent application.

Example 2

Objects were produced using filaments formed from samples 1-4 of Table 1 and inherent viscosity of the objects was measured in approximately a 60/40 solution of phenol/tetrachloroethane at a concentration of about 0.5 g/100 ml. The solution was heated to about 150° C. to mix and dissolve the material in the solution. The solution was then cooled to about 25° C. The inherent viscosity was determined by measuring the pressure used to force the solution down a narrow bore stainless steel tube relative to the pressure used to force the 60/40 phenol/tetrachoroethane solution without the material down the tube.

Table 3 shows the process conditions and inherent viscosity (I.V.) measurements for objects made from filaments of polymeric materials corresponding to samples 1-4 of Table 1 with the extrusion head having a first rate of extrusion of about 7.6 mm³/s for sample 1, about 7.4 mm³/s for sample 2, about 4.4 mm³/s for sample 3, and about 4 mm³/s for sample 4. Table 4 shows the process conditions and inherent viscosity measurements for objects made from filaments of polymeric materials corresponding to samples 1-4 of Table 1 with the extrusion head having a second rate of extrusion of about 8.7 mm³/s for sample 1, about 8.8 mm³/s for sample 2, about 4.8 mm³/s for sample 3, and about 4.1 mm³/s for sample 4. The inherent viscosity loss was calculated in Tables 3 and 4 based on a first inherent viscosity of the polymeric material before the objects were produced and a second inherent viscosity of the completed objects. The first inherent viscosity for sample 1 was about 0.619 dL/g, the first inherent viscosity for sample 2 was about 0.588 dL/g, the first inherent viscosity for sample 3 was about 0.720 dL/g, and the first inherent viscosity for sample 4 was about 0.735 dL/g. The second inherent viscosity measurements of the completed objects are shown in Tables 3 and 4.

TABLE 3

Inherent viscosity and inherent viscosity loss for objects produced using additive manufacturing at a first rate of extrusion.

| Temp. (° C.) | Sample 1 I.V. (dL/g)/ I.V. Loss (%) | Sample 2 I.V. (dL/g)/ I.V. Loss (%) | Sample 3 I.V. (dL/g)/ I.V. Loss (%) | Sample 4 I.V. (dL/g)/ I.V. Loss (%) |
|---|---|---|---|---|
| 220 | 0.612/1 | 0.572/3 | 0.676/6 | 0.689/6 |
| 225 | 0.611/1 | 0.562/4 | 0.672/7 | 0.668/9 |
| 230 | 0.611/1 | 0.555 6 | 0.651/10 | 0.662/10 |
| 235 | 0.606/2 | 0.552/6 | 0.632/12 | 0.631/14 |
| 240 | 0.606/2 | 0.554/6 | 0.619/14 | 0.618/16 |
| 245 | 0.604/2 | 0.549/7 | 0.613/15 | 0.602/18 |
| 250 | 0.601/3 | 0.544/7 | 0.607/16 | 0.602/18 |
| 255 | 0.599/4 | 0.538/9 | 0.605/16 | 0.596/19 |
| 260 | 0.599/4 | 0.543/8 | 0.597/17 | 0.592/19 |

TABLE 4

Inherent viscosity and inherent viscosity loss for objects produced using additive manufacturing at a second rate of extrusion.

| Temp. (° C.) | Sample 1 I.V. (dL/g)/ I.V. Loss (%) | Sample 2 I.V. (dL/g)/ I.V. Loss (%) | Sample 3 I.V. (dL/g)/ I.V. Loss (%) | Sample 4 I.V. (dL/g)/ I.V. Loss (%) |
|---|---|---|---|---|
| 220 | 0.616/0 | 0.581/1 | 0.708/2 | 0.712/3 |
| 225 | 0.616/0 | 0.573/3 | 0.698/3 | 0.711/3 |
| 230 | 0.618/0 | 0.572 3 | 0.686/5 | 0.698/5 |
| 235 | 0.613/1 | 0.567/4 | 0.676/6 | 0.692/6 |
| 240 | 0.612/1 | 0.563/4 | 0.666/7 | 0.676/8 |
| 245 | 0.610/1 | 0.556/5 | 0.657/9 | 0.660/10 |
| 250 | 0.602/3 | 0.551/6 | 0.637/12 | 0.649/13 |
| 255 | 0.601/3 | 0.551/6 | 0.622/14 | 0.619/16 |
| 260 | 0.604/4 | 0.552/6 | 0.610/15 | 0.608/17 |

Table 5 shows a summary of process conditions and inherent viscosity change between the inherent viscosity of a polymeric material before being used to produce an object using extrusion-based additive manufacturing and the inherent viscosity of a completed object produced from the polymeric material. The maximum temperature and the minimum temperature of Table 5 indicate the maximum and minimum temperatures at which adhesion between the layers of the object are sufficient. The objects produced from the polymeric material of sample 1 had values for the inherent viscosity drop that were less than that of objects produced using polymeric materials of samples 2-4. Additionally, the temperature range at which the objects produced using the polymeric material of sample 1 was greater than that of objects produced using polymeric materials of samples 2-4.

TABLE 5

Process conditions and inherent viscosity change between the inherent viscosity of a polymeric material before being used to produce an object and the inherent viscosity of a completed object produced from the polymeric material.

| | Temp. (° C.) | | Delta (° C.) | Rate (mm³/s) | | I.V. Drop | |
|---|---|---|---|---|---|---|---|
| | Min | Max | | Min | Max | Min | Max |
| Sample 1 | 230 | 245 | 15 | 7.6 | 8.7 | 0% | 2% |
| Sample 2 | 225 | 235 | 10 | 7.4 | 8.8 | 3% | 7% |
| Sample 3 | 235 | 245 | 10 | 4.4 | 4.8 | 6% | 14% |
| Sample 4 | 235 | 245 | 10 | 4 | 4.1 | 6% | 18% |

Adhesion was tested by using an Ultimaker 2 extrusion based additive manufacturing system to produce layers of objects at different temperatures while holding the speed relatively constant. A Python script was used to direct the system to form the layers of the objects. The adhesion was then tested at the different temperatures through a manual test of the amount of force exerted by a human hand to separate the layers. The minimum and maximum temperatures shown in Table 5 were recorded when the layers could not be readily separated by the use of a human hand.

Figure 5:
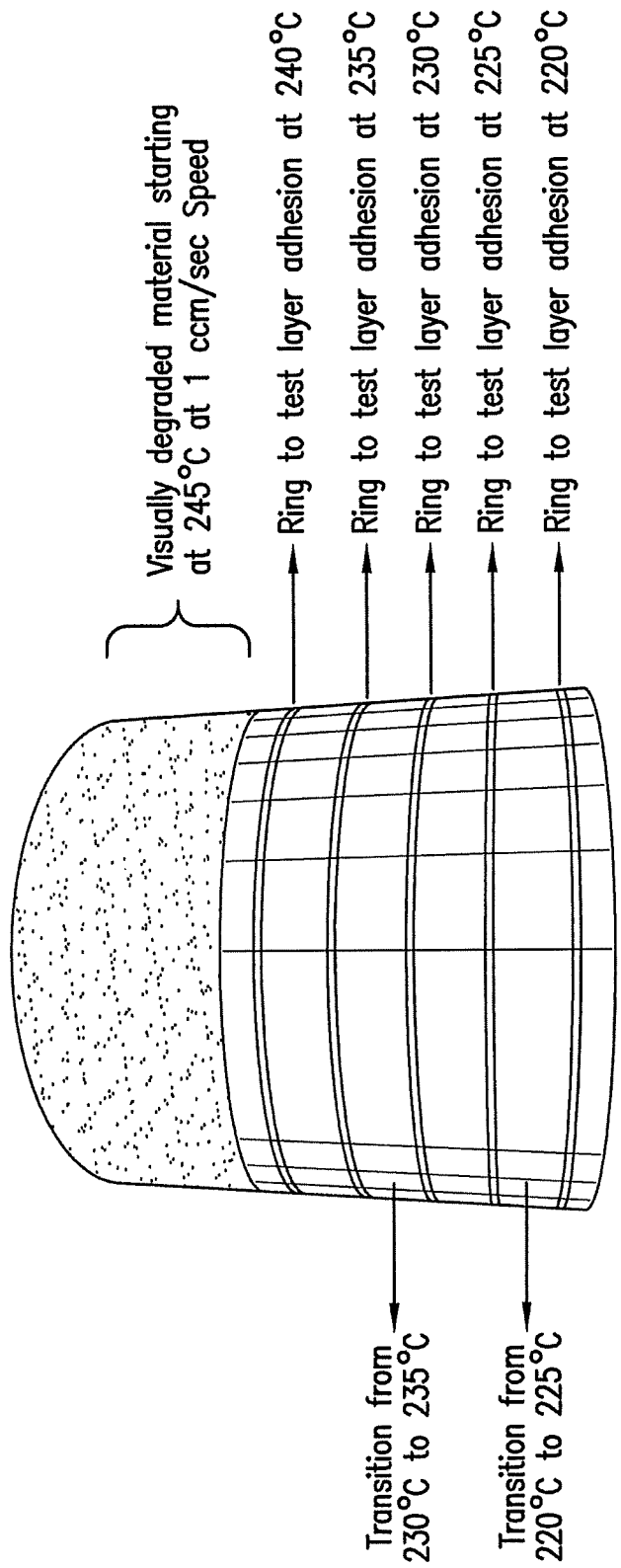
FIG. 5 shows an example object produced from a first polymeric material at an extrusion rate of about 1 mm3/s where the filament is heated at different temperatures before extruding the filament to form the object.
Figure 6:
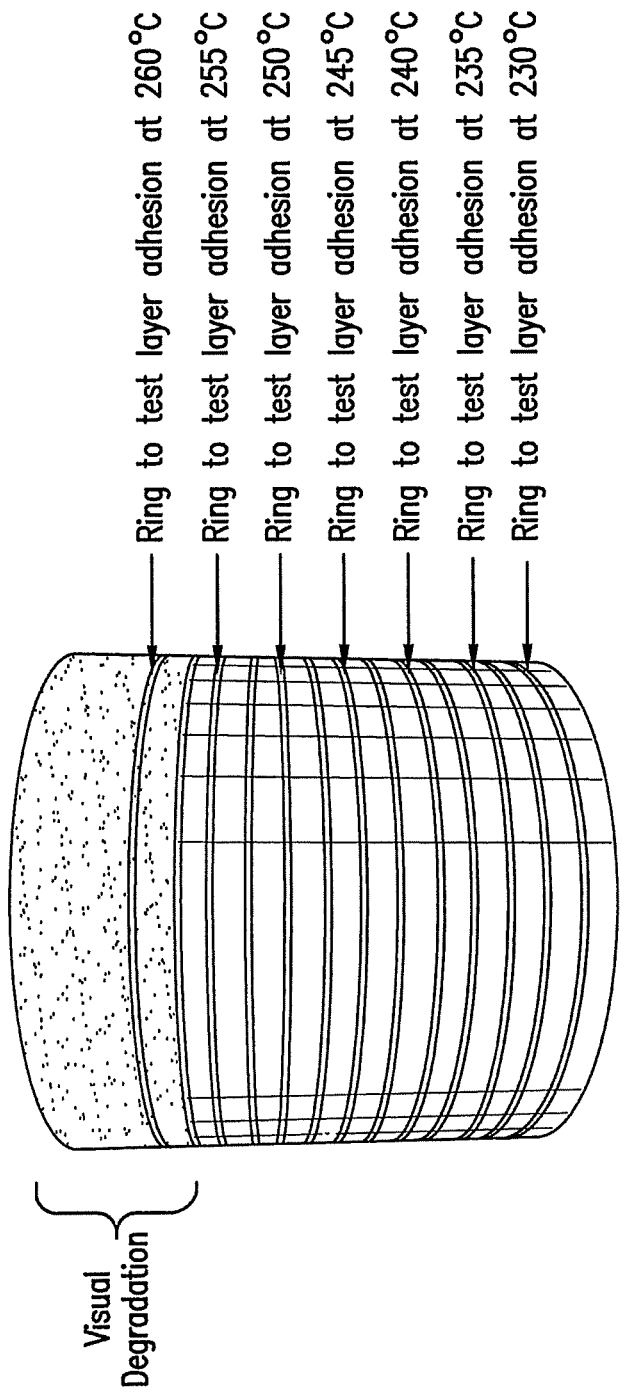
FIG. 6 shows another example object produced from a second polymeric material at an extrusion rate of about 2 mm3/s, where the filament is heated at different temperatures before extruding the filament to form the object.

FIG. 5 shows an example object produced at an extrusion rate of about 1 mm$^3$/s where the filament is heated at different temperatures before extruding the filament to form the object. In particular, the object shown in FIG. 5 is produced from a polymeric material according to the composition of Sample 4. When a different temperature was used to heat the filament prior to extrusion, a layer having a diameter that was less than the diameter of a previously formed layer was produced to aid in demarcating the transition between temperatures. The object shown in FIG. 5 includes demarcation lines indicating layers formed at 220° C., 225° C., 230° C., 235° C., and 240° C. FIG. 5 also shows that visual degradation of the object takes place when the layers of the object are produced at temperatures above 240° C. As the object shown in FIG. 5 was produced, adhesion was tested at each temperature transition point. For example, adhesion between the layers produced at 220° C. and adhesion between layers produced at 225° C. was tested by trying to separate the respective layers at the ring indicated in FIG. 5. Subsequent tests were performed for each of the temperature transitions. The same procedure was followed to test adhesion between layers produced at different temperatures for polymeric materials having compositions corresponding to Sample 1, Sample 2, and Sample 3. FIG. 6 shows an object produced using a polymeric material having a composition corresponding to Sample 1 at an extrusion rate of about 2 mm$^3$/s, where the filament is heated at different temperatures before extruding the filament to form the object. FIG. 6 shows that visual degradation of the object occurs at temperatures above 245° C. Table 6 shows visual degradation temperatures for objects produced using compositions of Sample, 1, Sample 2, Sample 3, and Sample 4. The first extrusion rate measurements are taken at a rate of extrusion of about 1 mm$^3$/s and the second extrusion rate measurements are taken at a rate of extrusion of about 2 mm$^3$/s.

TABLE 6

Temperatures at which visual degradation is observed in ° C.

|  | First Extrusion Rate | Second Extrusion Rate |
|---|---|---|
| Sample 1 | 245 | 260 |
| Sample 2 | 235 | 250 |
| Sample 3 | 245 | 260 |
| Sample 4 | 245 | 265 |

Figure 7:
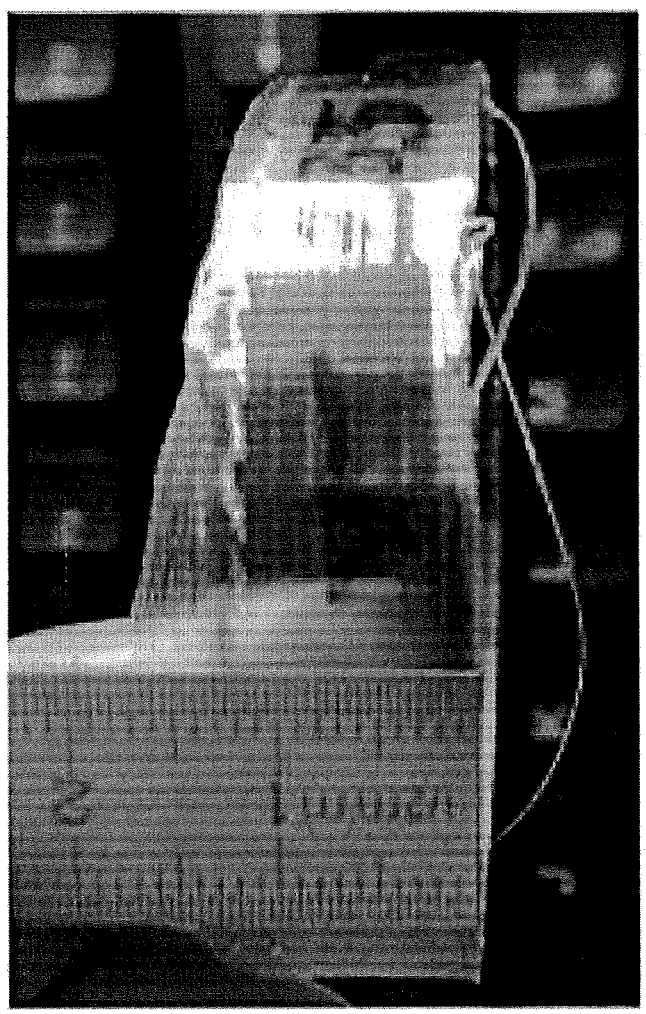
FIG. 7 shows an object produced from the first polymeric material at a temperature of about 235° C. using an extrusion based additive manufacturing apparatus, where the extrusion rate at which the layers of the object were formed increased with increasing height of the object.
Figure 8:
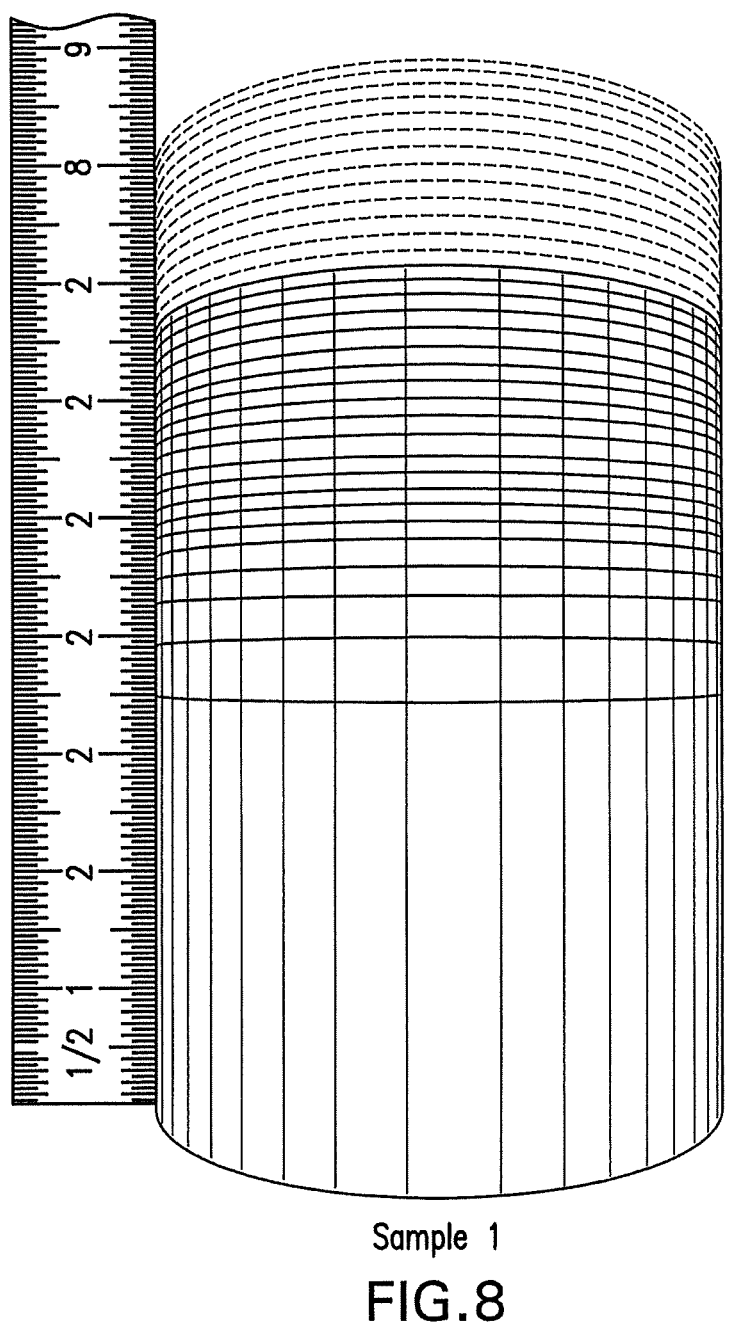
FIG. 8 shows an object produced from the second polymeric material at a temperature of about 235° C. using an extrusion based additive manufacturing apparatus, where the extrusion rate at which the layers of the object were formed increased with increasing height of the object.

FIG. 7 shows an object produced using the composition of Sample 4 at a temperature of about 235° C. using an extrusion based additive manufacturing apparatus. The extrusion rate at which the layers of the object were formed increased with increasing height of the object. Additionally, FIG. 8 shows an object produced using the composition of Sample 1 at a temperature of about 235° C. using an extrusion based additive manufacturing apparatus, where the extrusion rate at which the layers of the object were formed increased with increasing height of the object. The initial extrusion rate was about 1 mm$^3$/s. The extrusion rates recorded in Table 5 were calculated by measuring a height of an object formed according to the composition corresponding to the respective sample before degradation occurred using the following formula:

$$\text{Extrusion Rate in mm}^3/\text{s} = \frac{\text{height measured}}{5} + \text{initial extrusion rate}$$

The constant "5" in the formula indicates that the extrusion rate increases by 1 mm$^3$/s for every 5 mm of the object produced. The height of the tower shown in FIG. 8 versus the height of the tower shown in FIG. 7 shows that the polymeric material used to produce the tower of FIG. 8 can be used to form objects over a greater range of extrusion rates indicating physical properties that are more conducive to extrusion-based additive manufacturing processes than the polymeric material used to form the tower of FIG. 7.

Notched Izod testing was performed on objects produced from polymeric materials related to samples 1-4 and the results are shown in Table 7. The highest and lowest values in Table 6 for the notched Izod test results are measured in KJ/m$^2$. The notched Izod tests were carried out according to the ASTM D256 standard at the time of filing of this patent application. The objects produced from the polymeric material corresponding to sample 1 had the least variability in the notched Izod test results.

TABLE 7

Notched Izod test results.

|  | Max | Min | Delta | Variability |
|---|---|---|---|---|
| Sample 1 | 47 | 46.5 | 0.5 | 0.03 |
| Sample 2 | 47.3 | 46.7 | 0.6 | 0.06 |
| Sample 3 | 47.4 | 46.4 | 1 | 0.1 |
| Sample 4 | 47.9 | 45.7 | 2.2 | 0.22 |

CONCLUSION

In closing, although the various implementations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

ILLUSTRATIVE EXAMPLES OF INVENTIVE CONCEPTS

While Applicant's disclosure includes reference to specific implementations above, it will be understood that modifications and alterations may be made by those practiced in the art without departing from the spirit and scope of the inventive concepts described herein. All such modifications and alterations are intended to be covered. As such the illustrative examples of the inventive concepts listed below are merely illustrative and not limiting.

Example 1

An article comprising: a plurality of layers of a polymeric material that includes units of a diacid component and units of a glycol component, wherein the units of the diacid component are derived from a first diacid and a second diacid.

Example 2

The article of example 1, wherein the plurality of layers are arranged according to a design.

Example 3

The article of any one of examples 1-2, wherein the first diacid is terephthalic acid and the second diacid is isophthalic acid, a cyclohexanedicarboxylic acid, a naphthalenedicarboxylic acid, a stilbenedicarboxylic acid, or a combination thereof.

Example 4

The article of any one of examples 1-3, wherein the diacid component includes from about 40 mole % to about 60 mole % of units derived from the first diacid and from about 40 mole % to about 60 mole % of units derived from the second diacid.

Example 5

The article of any one of examples 1-3, wherein the diacid component includes from about 45 mole % to about 55 mole % of units derived from terephthalic acid and from about 45 mole % to about 55 mole % of units derived from isophthalic acid.

Example 6

The article of any one of examples 1-5, wherein the units of the glycol component are derived from cyclohexanedimethanol.

Example 7

The article of any one of examples 1-6, wherein the glycol component includes from about 75 mole % to about 98 mole % of units derived from a first glycol and from about 2 mole % to about 25 mole % of units derived from one or more second glycols.

Example 8

The article of example 7, wherein the first glycol includes cyclohexanedimethanol and the one or more second glycols include ethylene glycol, a propanediol, neopentyl glycol, a butanediol, a pentanediol, a hexanediol, p-xylene glycol, or a combination thereof.

Example 9

The article of any one of examples 1-8, wherein the polymeric material has an inherent viscosity from about 0.55 dlg to about 0.7 dlg, a density no greater than about 1.25 g/cm3, a glass transition temperature of at least about 80° C., and a crystallization half-time no greater than about 300 minutes.

Example 10

An article comprising: a body comprised of a polymeric material that includes units of a diacid component and units of a glycol component, wherein: the body has a diameter from about 1 mm to about 5 mm and a length of at least about 3 cm; and an inherent viscosity loss of an object formed from the polymeric material relative to the polymeric material before forming the object is no greater than about 0.9%.

Example 11

The article of example 10, wherein the polymeric material has a zero shear viscosity no greater than about 3000 Poise.

Example 12

The article of any one of examples 10-11, wherein the polymeric material has an elongation at break of at least about 75%.

Example 13

The article of any one of examples 10-12, wherein the polymeric material has a density no greater than about 1.25 g/cm3.

Example 14

The article of any one of examples 10-13, wherein the polymeric material has a glass transition temperature of at least about 80° C.

Example 15

The article of any one of examples 10-14, wherein the body has a length of at least about 3 cm.

Example 16

The article of any one of examples 10-15, wherein the body has a diameter from about 1.5 mm to about 3 mm and a length of at least about 2 m.

Example 17

The article of any one of examples 10-16, wherein the units of the glycol component are derived from cyclohexanedimethanol, from about 40 mole % to about 60 mole % of the units of the diacid component are derived from terephthalic acid, and from about 40 mole % to about 60 mole % of the units of the diacid component are derived from isophthalic acid.

Example 18

A process comprising: heating a polymeric material at a temperature from about 225° C. to about 250° C., the polymeric material including units of a diacid component and units of a glycol component; extruding a plurality of layers of the polymeric material onto a substrate to form an object, where a rate of extrusion is from about 7 mm³/s to about 9 mm³/s; wherein an inherent viscosity loss of the object relative to the polymeric material before forming the object is no greater than about 5% when the polymeric material is heated at a temperature of about 250° C.

Example 19

The process of example 18, wherein the plurality of layers of the polymeric material are deposited onto the substrate according to a predetermined design.

Example 20

The process of any one of examples 18-19, wherein depositing the plurality of layers of the polymeric material onto the substrate includes extruding the polymeric material onto the substrate via an extrusion head.

Example 21

The process of any one of examples 18-20, wherein the units of the glycol component are derived from cyclohexanedimethanol, from about 40 mole % to about 60 mole % of the units of the diacid component are derived from terephthalic acid, and from about 40 mole % to about 60 mole % of the units of the diacid component are derived from isophthalic acid.

Example 22

The process of any one of examples 17-21, wherein the polymeric material has an inherent viscosity from about 0.55 dig to about 0.7 dig, a density no greater than about 1.25 g/cm3, a glass transition temperature of at least about 80° C., and a crystallization half-time no greater than about 300 minutes.

Example 23

The process of any one of examples 17-22, wherein the inherent viscosity loss is no greater than about 2%.

Example 24

A process comprising: combining a diacid component and a glycol component to form a polymeric material, wherein the diacid component includes a first diacid and a second diacid; extruding the polymeric material to form a filament, the filament having a body with a diameter from about 1 mm to about 5 mm and a length of at least about 3 cm.

Example 25

The process of example 24, wherein the extruding the polymeric material to form the filament is performed by an extruder having a single screw or a twin screw.

Example 26

The process of example 25, wherein a screw speed of the extruder is from about 60 rotations per minute (rpm) to about 85 rpm.

Example 27

The process of example 25, wherein at least one chamber of the extruder is heated at a temperature from about 210° C. to about 240° C.

Example 28

The process of any one of examples 24-27, further comprising grinding pellets of at least one of the diacid component or the glycol component before combining the diacid component and the glycol component.

Example 29

The process of any one of examples 24-28, wherein the filament has a length of at least about 30 cm.

Example 30

The process of any one of examples 24-29, wherein the filament has a length from about 30 cm to about 5 m.

Example 31

The process of any one of examples 24-30, further comprising: depositing a plurality of layers of the filament onto a substrate according to a predetermined design to produce an object; and removing the object from the substrate.

Example 32

The process of any one of examples 24-31, wherein the units of the glycol component are derived from cyclohexanedimethanol and the units of the diacid component are derived from terephthalic acid and isophthalic acid.

The invention claimed is:

1. A filament formed from a polymeric material, said polymeric material comprising:
   units of an acid component and units of a glycol component,
   wherein the units of the acid component comprises from 45 mole % to 55 mole % of units derived from a first diacid, from 45 mole % to 55 mole % of units derived from a second diacid, and 0 to 4 mole % of units derived from additional acids, wherein the first diacid is terephthalic acid and the second diacid is chosen from isophthalic acid, a cyclohexanedicarboxylic acid, a naphthalenedicarboxylic acid, a stilbenedicarboxylic acid, or a combination thereof;
   wherein the glycol component is 100 mole % of units derived from cyclohexanedimethanol;
   wherein the polymeric material includes 100 mole % of the acid component and 100 mole % of the glycol component,
   wherein the polymeric material has an inherent viscosity from 0.6 dL/g to 0.7 dL/g, a density no greater than about 1.25 g/cm$^3$, a glass transition temperature of at least about 80° C., a crystallization half-time no greater than about 300 minutes, and an inherent viscosity loss of 3% or less after being extruded through an extrusion head on a three-dimensional printer at a temperature in the range from 220° C. to 245° C. and at a rate of 7.6 mm$^3$/s; and
   wherein the polymeric material is formed into a filament having a diameter in the range from 1.5 mm to 5 mm.

2. The filament of claim 1, wherein the diacid component includes from 45 mole % to 55 mole % of units derived from terephthalic acid and from 45 mole % to 55 mole % of units derived from isophthalic acid.

3. The filament of claim 1, wherein the polymeric material has an inherent viscosity loss of 2.5% or less after being extruded through an extrusion head on a three-dimensional printer at a temperature in the range from 220° C. to 245° C. and at a rate of 7.6 mm$^3$/s.

4. The filament of claim 3, wherein the diacid component includes from 48 mole % to 55 mole % of units derived from terephthalic acid and from 45 mole % to 52 mole % of units derived from isophthalic acid, and wherein the glycol component is 100 mole % of units derived from cyclohexanedimethanol.

5. The filament of claim 1, wherein the acid component further comprises 0.1 mole % to 1.5 mole % of a branching agent selected from the group consisting of trimellitic anhydride, trimellitic acid, pyromellitic dianhydride, trimesic acid, hemimellitic acid, glycerol, trimethylolpropane, pentaerythritol, 1,2,4-butanetriol, 1,2,6-hexanetriol, sorbitol, 1,1,4,4-tetrakis(hydroxymethy)cyclohexane, dipentaerythritol, or combinations thereof.

6. The filament of claim 1, wherein the filament has a diameter in the range from 1.5 mm to 3 mm.

7. A method for making an article by fused filament fabrication, said method comprising forming fused filament polymer layers by 3D printing using the filament according to claim 1.

8. The method according to claim 7, wherein the layers are formed by extruding the filament at a temperature in the range from 180° C. to 260° C. and at a rate in the range from 2 mm$^3$/s to about 12 mm$^3$/s.

9. The filament of claim 4, wherein the acid component does not include units of any additional acids.

* * * * *